US007338637B2

(12) United States Patent
Pease et al.

(10) Patent No.: US 7,338,637 B2
(45) Date of Patent: Mar. 4, 2008

(54) MICROFLUIDIC DEVICE WITH THIN-FILM ELECTRONIC DEVICES

(75) Inventors: Grant Pease, Corvallis, OR (US); Adam L Ghozeil, Corvallis, OR (US); John Stephen Dunfield, Corvallis, OR (US); Winthrop D. Childers, San Diego, CA (US); David Tyvoll, La Jolla, CA (US); Douglas A. Sexton, La Jolla, CA (US); Paul Crivelli, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 10/355,397

(22) Filed: Jan. 31, 2003

(65) Prior Publication Data

US 2004/0151629 A1 Aug. 5, 2004

(51) Int. Cl.
*B01L 3/02* (2006.01)
*B32B 5/02* (2006.01)
*B32B 27/04* (2006.01)
*B32B 27/12* (2006.01)
*G01N 15/06* (2006.01)

(52) U.S. Cl. ......................... 422/68.1; 422/50; 422/58; 422/63; 422/81; 422/82.01; 422/82.02; 422/100; 422/101; 422/102; 436/43; 436/63; 436/149; 436/180

(58) Field of Classification Search ............... 29/592.1, 29/592; 73/1.01, 1.02; 422/50, 58, 63, 68.1, 422/81, 82.01, 82.02, 100, 101, 102; 436/43, 436/63, 149, 180
See application file for complete search history.

(56) References Cited

U.S. PATENT DOCUMENTS

| | | | | |
|---|---|---|---|---|
| 5,849,208 | A * | 12/1998 | Hayes et al. | 216/94 |
| 5,932,799 | A | 8/1999 | Moles | |
| 5,965,452 | A | 10/1999 | Kovacs | |
| 6,126,899 | A * | 10/2000 | Woudenberg et al. | 422/50 |
| 6,428,749 | B1 | 8/2002 | Kajiyama et al. | |
| 6,440,725 | B1 * | 8/2002 | Pourahmadi et al. | 435/288.5 |
| 6,497,474 | B2 * | 12/2002 | Irinoda et al. | 347/54 |
| 6,544,734 | B1 * | 4/2003 | Briscoe et al. | 435/6 |
| 6,572,830 | B1 * | 6/2003 | Burdon et al. | 422/186.29 |
| 2002/0079219 | A1 | 6/2002 | Zhao et al. | |
| 2002/0090641 | A1 | 7/2002 | Yasuda et al. | |
| 2004/0086427 | A1 * | 5/2004 | Childers et al. | 422/100 |

* cited by examiner

*Primary Examiner*—Brian Sines

(57) ABSTRACT

A microfluidic device for analysis of a sample. The microfluidic device includes a substrate portion that at least partially defines a chamber for receiving the sample. The substrate portion includes a substrate having a surface. The substrate portion also includes a plurality of thin-film layers formed on the substrate adjacent the surface. The thin-film layers form a plurality of electronic devices. Each of at least two of the electronic devices is formed by a different set of the thin-film layers. The at least two electronic devices may include 1) a temperature control device for controlling the temperature of fluid in the chamber, and 2) an other electronic device configured to sense or modify a property of fluid in the chamber.

29 Claims, 12 Drawing Sheets

MICROFLUIDIC DEVICE WITH THIN-FILM ELECTRONIC DEVICES

BACKGROUND

Rapid progress in genomics, proteomics, and cell analysis has pushed the biotechnology sector to develop faster and more efficient devices for analyzing biological samples. Accordingly, the biotechnology sector has directed substantial effort toward developing miniaturized microfluidic devices, often termed labs-on-a-chip, for sample manipulation and analysis. Such devices may analyze samples in small volumes of liquid, providing more economical use of reagents and samples, and in some cases dramatically speeding up assays. These devices offer the future possibility of human health assessment, genetic screening, and pathogen detection as routine, relatively low-cost procedures carried out very rapidly in a clinical setting or in the field. In addition, these devices have many other applications for manipulation and/or analysis of nonbiological samples.

Some microfluidic devices are configured to process samples in microfluidic chambers using electrical circuitry. Such microfluidic devices may be configured so that electrical devices provided by the electrical circuitry process samples in the chambers. In some cases, the electrical devices may include heaters to heat fluid in the chambers, for example, to accelerate the rate of a chemical or enzymatic reaction. In other cases, the electrical devices may include electrodes used to form an electric field to move charged molecules and/or fluid within the chambers. However, with very small fluid chambers, space for electrical devices may become limited and independent control of the electrical devices may not be possible. Accordingly, processing capabilities within the fluid chambers may be compromised by a need to select one type of device over another to occupy the limited space available.

The problems associated with limited space may be particularly apparent with temperature control. For example, it may be desirable to perform two or more reactions at distinct temperatures within a chamber or set of closely spaced chambers in a microfluidic device. In addition to problems associated with positioning a sufficient number of thermal control devices in the available space, the temperature of one reaction may interfere with the ability to maintain a desired temperature for the other closely spaced reaction(s) due to insufficient thermal insulation between the reactions. This insulation problem may become more acute when the temperatures of the reactions are very different. Spatially separating the reactions by a greater distance may improve thermal insulation between the reactions, but at the expense of a decreased density of chambers and thus reduced capability of the microfluidic device.

SUMMARY

A microfluidic device is provided for analysis of a sample. The microfluidic device includes a substrate portion that at least partially defines a chamber for receiving the sample. The substrate portion includes a substrate having a surface. The substrate portion also includes a plurality of thin-film layers formed on the substrate adjacent the surface. The thin-film layers form a plurality of electronic devices. Each of at least two of the electronic devices is formed by a different set of the thin-film layers. The at least two electronic devices may include 1) a temperature control device for controlling the temperature of fluid in the chamber, and 2) an other electronic device configured to sense or modify a property of fluid in the chamber.

DETAILED DESCRIPTION

Figure 1:
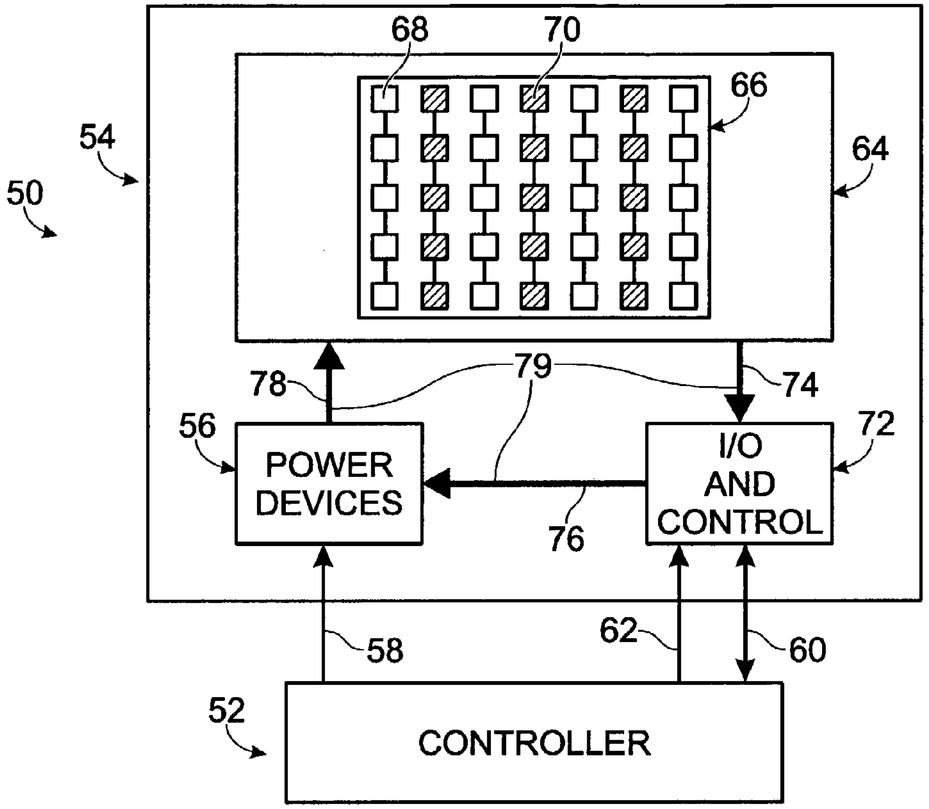
FIG. 1 is a schematic view of an embodiment of a biochip controlled by a controller, with the biochip including an array of thermal control devices.

Systems, including methods and apparatus, are provided for microfluidic processing of samples using a microfluidic device having an array of thin-film electronic devices. The array may be included in a substrate portion that at least partially defines a fluid compartment of the microfluidic device. The array of electronic devices may be disposed so the electronic devices can participate in sample processing and/or monitoring in the fluid compartment. The substrate portion may include a substrate and a plurality of thin-film layers formed on the substrate. The thin-film layers may form at least two of the thin-film electronic devices using a different set of the layers for each device. The at least two thin-film electronic devices may be disposed in a generally stacked relationship relative to the substrate's surface, so that at least one electronic device is disposed over another electronic device. For example, a thermal control device, such as a heater or temperature sensor, may be disposed under at least one other device, such as another thermal control device, an electrode, or a transducer, among others. In some cases, two or more electronic devices of the array may be intersected by a line that extends generally normal to the surface of the substrate. Accordingly, electronic devices may be disposed more efficiently in relation to microfluidic processing chambers, enabling more flexibility in how samples are manipulated. Furthermore, devices that participate in related aspects of microfluidic processing, such as heaters/coolers and temperature sensors, may be disposed in a more cooperative spatial relationship to modify and sense the temperature of substantially the same fluid volume.

Independently addressable electronic devices for thermal control also are provided. These thermal control devices may facilitate defining distinct thermal zones or regions across the substrate portion. In some embodiments, a heater/cooler and a temperature sensor work together to provide closed loop temperature control. Accordingly, the substrate portion may include control electronics that receive digital words, corresponding to desired temperature set points for different regions of the substrate portion, from external the substrate portion. The control electronics may function in a closed loop with sets of heater/coolers and sensors to achieve and maintain the desired set points.

In some embodiments, the distinct thermal zones may be thermally isolated by thermal control features, that is, thermal conductors and/or insulators. The thermal control features may be defined by the substrate and/or by thin-film layers formed on the substrate. For example, thermal conductors may include isolated heat spreaders that promote conduction of heat from underlying heaters toward an overlying fluid chamber. Exemplary thermal insulators may include 1) thermal insulating layers disposed between the underlying substrate and thin-film electronic devices formed thereon, or 2) substrate or thin-film discontinuities disposed generally between adjacent fluid compartments or thermal zones. Therefore, thermal control devices and features may be combined in any suitable relationship to provide greater flexibility and control of chamber temperatures during sample processing.

Further aspects are provided in the following sections: (I) control and disposition of electronic devices, (II) microfluidic analysis with an integrated cartridge, (III) microfluidic systems, (IV) samples, and (V) assays.

I. Control and Disposition of Electronic Devices

This section describes microfluidic systems that include an array of thin-film electronic devices for sample processing and/or analysis; see FIGS. 1-12. The array may be substantially one-, two-, or three-dimensional. In addition, the array may include an arrangement of thermal control devices and associated thermal control features that enables independent temperature control of closely spaced regions of fluid disposed adjacent the array.

FIG. 1 shows a schematic view of a microfluidic system 50 for sample analysis. System 50 may include a controller or control apparatus 52 that is electrically coupled to a microfluidic device or biochip 54. The controller may supply instructions to the microfluidic device from a user or based upon preset instructions. The microfluidic device receives sample(s) (or a partially processed version thereof), and then may process and analyze the sample(s) in a microfluidic chamber(s) to assay an aspect of the sample, such as presence of an analyte.

Controller 52 may include a power supply, a processor, and a user interface. Controller 52 may send power to onboard power devices 56 of biochip 54 (such as FETS), as shown at 58. In addition, controller 52 may send information to and receive information from biochip 54, using I/O line(s) 60. Furthermore, controller 52 may coordinate electronic operations performed by device 54 by sending clock signals through a clock line 62.

Biochip 54 includes a sample-processing portion 64 having an array of thin-film electronic devices 66 and one or more chambers (not shown) configured to hold fluid and disposed adjacent the electronic devices. Accordingly, electronic devices 66 may be disposed near the fluid chamber(s) so that each electronic device can sense or modify a property of sample/fluid in the fluid chamber(s), that is, interact with the sample/fluid. Suitable properties that may be sensed or modified include, but are not limited to, temperature; flow rate (velocity); pressure; fluid/sample (or analyte) presence/absence, concentration, amount, mobility, or distribution; an optical characteristic; a magnetic characteristic; electric field strength, disposition, or polarity; an optical characteristic; an electrical characteristic; and/or a magnetic characteristic.

Thin-film electronic devices generally include any electronic device provided by one or more thin-films layers formed on a substrate. The devices are electronic because they are included in electronic circuitry having electronic switching devices. Each thin-film electronic device may be defined by a set of thin-film layers. The set may have one or more layers. In some embodiments, each of two or more thin-film electronic devices is defined by a different set of the thin-film layers. The different sets may be nonoverlapping, that is, having no layers in common or may share one or more layers. Suitable thin-film electronic devices may include electrodes for applying electric fields, sensors, transducers, optical-based devices, acoustic-based devices (such as piezo-based oscillators for applying ultrasonic energy), electric field-based devices, and magnetic field-based devices, among others. Sensors may be temperature sensors (thermocouples, thermistors (resistive heating devices), p-n junctions, degenerative band-gap sensors, etc.), light sensors (for example photodiodes or other optoelectronic devices), pressure sensors (for example, piezoelectric elements), fluid flow rate sensors (for example, based on sensing pressure or rate of heat loss from a heating element), and electrical sensors, among others. Here, biochip 54 includes an array of thermal control devices, that is, heaters 68 and temperature sensors 70. Heaters 68 (or coolers) and temperature sensors 70 may be arrayed in alternating rows as shown. However, as described more fully below, any one, two, or three-dimensional arrangement of electronic devices may be suitable.

Biochip 54 also may include control electronics 72 electrically coupled to power devices 56 and electronic devices 66. The control electronics may receive instructions from controller 52 and output signals from electronic devices 66, such as from temperature sensors 70, shown at 74. In addition, the control electronics may send input signals, shown at 76, to power devices 56. The input signals may determine the timing, duration, and/or magnitude of power supplied, shown at 78, to electronic devices 66, such as heaters 68. Accordingly, control electronics 72 may form a closed loop (or loops) 79 in which the control electronics interface with a set of sensing and modifying electronic devices 66 to achieve a desired set point. For example, biochip 54 may have closed-loop temperature control in which a desired temperature or set point for a zone or region of sample-processing portion 64 is communicated to control electronics 72 with a corresponding digital word received from controller 52 through I/O line 60. In this case, control electronics 72 turn on biochip heater(s) at suitable times and durations, in part, based on signals received from an associated temperature sensor(s). This maintains the temperature near the set point. Alternatively, biochip control electronics 72 may be at least partially or completely included in controller 52.

Figure 2:
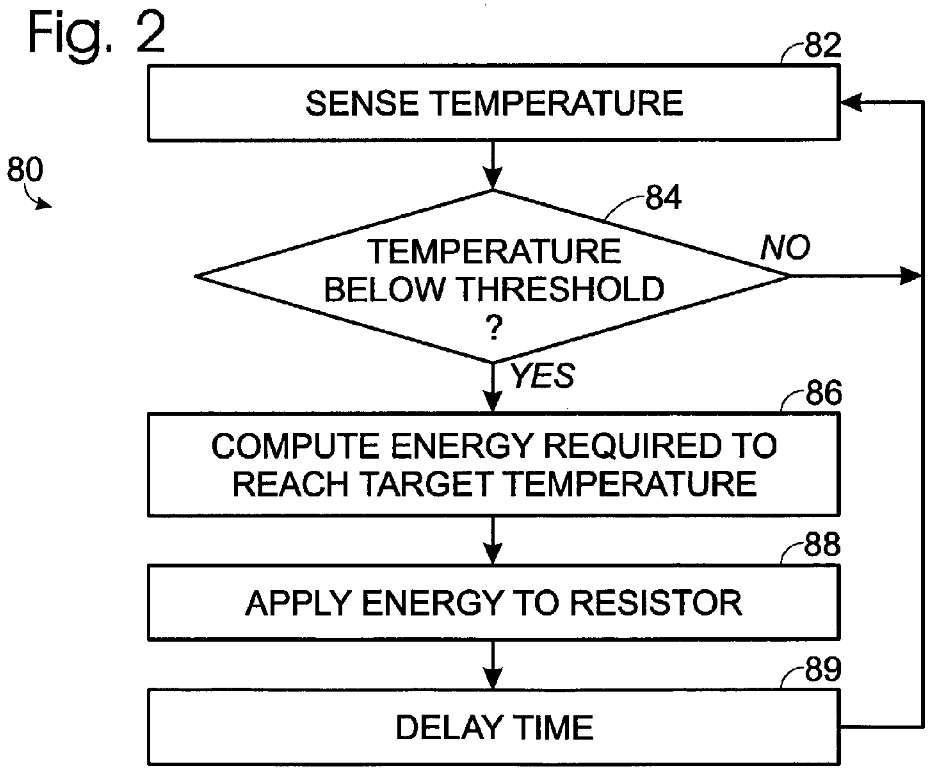
FIG. 2 is a schematic diagram showing an embodiment of a method for closed-loop temperature control in a biochip.

FIG. 2 shows an embodiment of a method 80 for closed-loop temperature control in a thermal control zone of a biochip. This method may avoid problems associated with overheating a temperature sensor using a heater disposed in close proximity to the sensor within a biochip. Without any delay for equilibration after applying energy to the heater, the sensor may sense a rapid temperature increase and turn off the heater too rapidly. By using method 80, however, the system may steadily approach a target temperature in a stable manner.

Method 80 may be carried out using a target temperature for the thermal control zone, and a threshold temperature below the target temperature. The threshold temperature defines the sensed temperatures at which heating is triggered. The threshold temperature may be preset, that is, input by a user or predefined otherwise. Initially, a temperature sensor may sense temperature of the thermal control zone, shown at 82. The sensed temperature then may be compared with the threshold temperature, shown at 84, to determine if the sensed temperature is below the threshold temperature. If not, the temperature may be sensed again, shown at 82, generally after an arbitrary or predefined delay period. Alternatively, if the temperature is below the threshold temperature, the energy necessary to increase the sensed temperature to the target temperature may be computed, shown at 86. Next, an amount of energy corresponding to the computed energy may be applied, shown at 88, to a heating device(s), such as a resistor, disposed in the thermal control zone. After pausing for a suitable delay time, shown at 89, the method may cycle by sensing the temperature, shown at 82. In some embodiments, the amount of energy applied to the heating device may be independent of the difference between the sensed and target temperatures.

Figure 3:
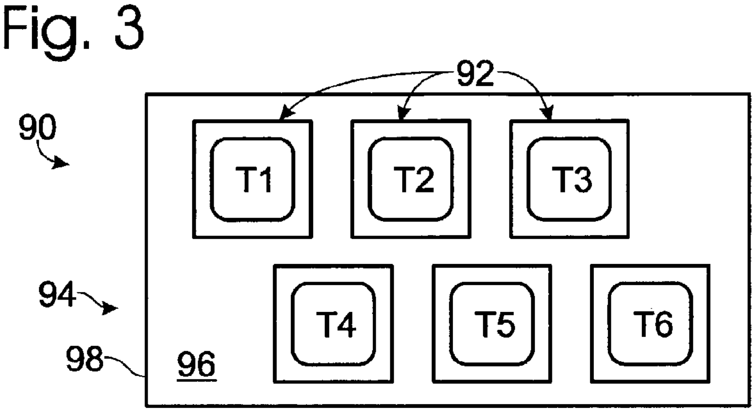
FIG. 3 is a somewhat schematic plan view of an embodiment of a biochip having isolated thermal control zones defined by an array of thermal control devices.

FIG. 3 shows a schematic view of an embodiment of a biochip 90 having thermal control zones 92 defined by an array of thermal control devices. Thermal control zones 92 are isolated so that each zone may be adjusted independently to a different temperature, represented by T1, T2, T3, etc. The thermal control zones may be arrayed within a substrate portion 94 of biochip 90, in an array that is generally parallel to a surface 96 of a substrate 98 on which thermal control devices are formed. Thermal control zones 92 may correspond to regions under different fluid chambers and/or to different regions under one fluid chamber.

Figure 4:
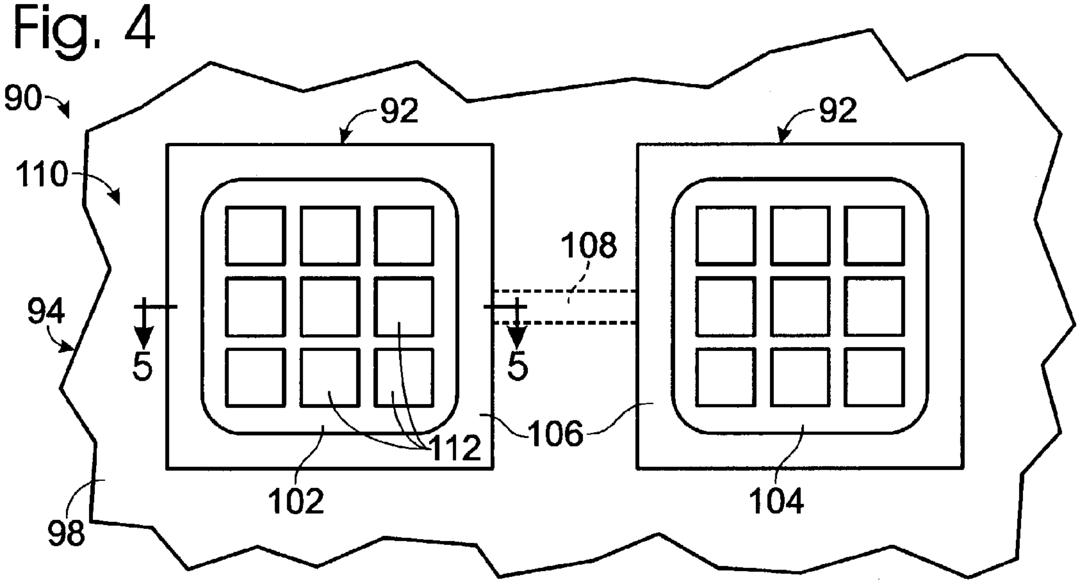
FIG. 4 is a fragmentary view of two of the thermal control zones from the biochip of FIG. 3.

FIG. 4 shows an enlarged view of thermal zones 92 from biochip 90 of FIG. 3. Each thermal zone 92 may underlie a fluid chamber 102, 104 defined by a fluid barrier 106 and substrate portion 94. Each fluid chamber may be configured to carry out a separate process, either in sequence or in parallel. In an exemplary use of the fluid chambers, each chamber may be used for assaying a nucleic acid(s) (such as DNA) at independently controlled temperatures. For example, the nucleic acid may be assayed in parallel at different temperatures to achieve different degrees of selectivity. Chambers 102, 104 may be isolated from one another or may be in fluid communication using a fluid pathway 108. The fluid pathway may extend into or through substrate 98 and/or may be defined by fluid barrier 106.

Each thermal zone may be defined in substrate portion, at least in part, by thin films 110 formed on substrate 98. Thin films 110 may form heaters and temperature sensors for controlling the temperature of the thermal zone. One or more electrodes 112 for creating an electric field within the chamber may be formed by a thin film that underlies the chamber and overlies the thermal zone. The electrodes may be used, for example, to move or focus charged molecules, such as DNA, to enhance the assay process. The electrodes may be independently addressable and energizable.

Figure 5:
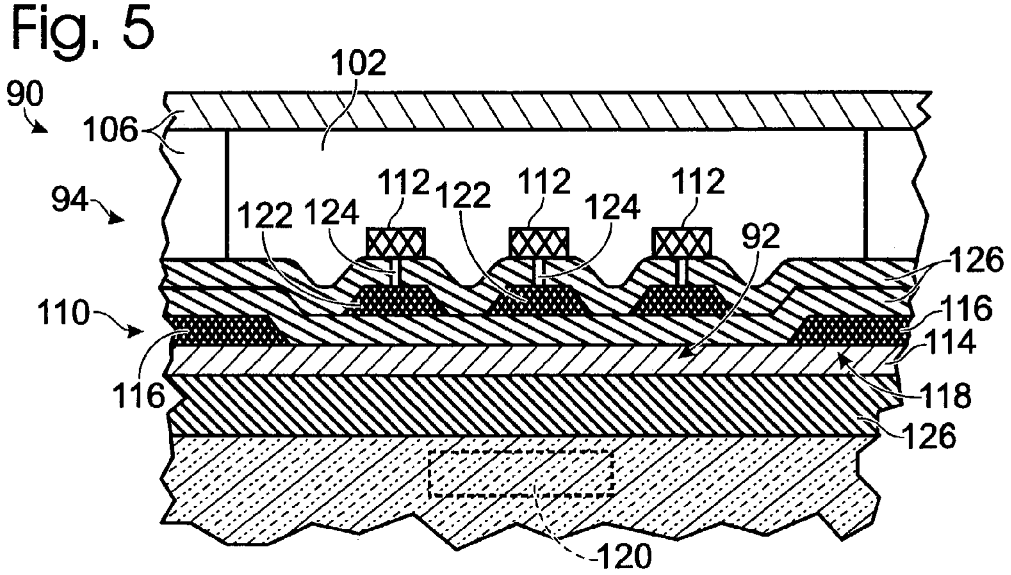
FIG. 5 is a sectional view of a thermal control zone from the biochip of FIG. 3, taken generally along line 5-5 of FIG. 4.

FIG. 5 shows a sectional view of thermal control zone 92 and overlying chamber 102 from biochip 90. Thin films 110 of thermal zone 92 may define a heater within zone 92. For example, a resistive layer 114 may be included in a thermal control circuit using a conductive layer 116 to provide a thin-film resistor 118 for resistive heating of fluid in chamber 102. A temperature sensor 120 may be disposed in close proximity to resistor 118. Sensor 120 may be formed by one or more distinct thin-film layers disposed above surface 96 of substrate 98, underlying or overlying a heater, as described more fully below. Alternatively, or in addition, the sensor may be disposed within the substrate, as shown here, for example, by doping a semiconductive substrate to form a p-n junction. (Sensor 120 is shown in dotted outline to indicate flexibility in where it may be positioned.) Electrodes 112 may be disposed generally above thin-film resistor 118. The electrodes may receive voltage signals from conductive traces 122 using electrical vias 124 that conductively connect electrodes 112 to traces 122. Insulating layers 126 may underlie or overlie any suitable layer(s) to provide thermal, chemical, and/or electrical insulation, among others. Insulating layers are described in more detail below.

Figure 6:
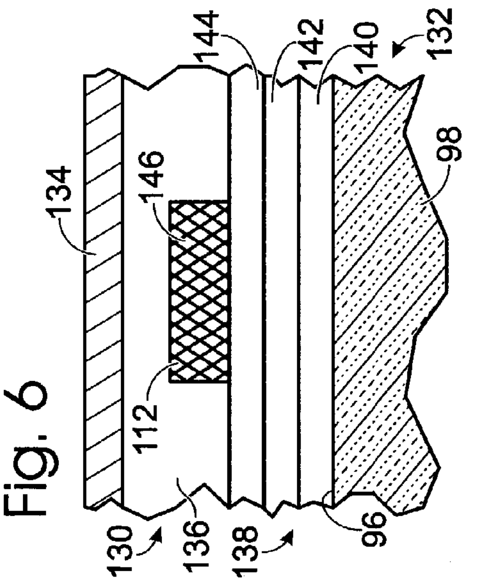
FIG. 6 is a somewhat schematic sectional view of a thermal control zone that may be included in a biochip.

FIG. 6 shows a somewhat schematic sectional view of a thermal control region or thermal zone 130 of a biochip. Control zone 130 includes a substrate portion 132 and a fluid barrier 134 connected to the substrate portion. Each of the substrate portion and the fluid barrier may at least partially define a chamber 136 in which fluid is contained and sample is processed.

Substrate portion 132 may include a plurality of thin-film layers 138 formed on substrate 98, that is, above and adjacent to surface 96. The thin-film layers may define distinct thermal control devices and features, each using one or plural thin-film layers. For example, substrate portion 132 may include an underlying insulation layer or thermal barrier 140 formed adjacent substrate 98. The thermal barrier or thermal layer may be formed by any other suitable added layer that is capable of more efficient thermal insulation than substrate 98. Alternatively, the thermal barrier may not be a thin-film layer, but may be a field oxide layer formed from the substrate, for example, when the substrate is silicon. Substrate portion 132 also may include a device layer 142 of electronic devices for thermal control (that is, heaters, coolers, and/or temperature sensors). Device layer 142 may overlie a surface of the substrate and insulation layer 140. Another insulation layer, a passivation layer 144 may overlie device layer 142 to electrically and/or chemically protect the device layer from the fluid contents of fluid chamber 136. Furthermore, a thermal conduction layer 146 may overlie the other layers. Conduction layer 146 may promote more efficient conduction of heat between device layer 142 and fluid chamber 136. In some embodiments, conduction layer 146 may be formed of an electrically conductive metal or metal alloy, such as gold, platinum, aluminum, copper, and/or the like. In addition, conduction layer 146 may be included in a circuit using conductive traces (see FIG. 5) to provide at least one electrode 112.

As used herein, the terms "overlying" and "underlying" describe a spatial relationship defined generally relative to a substrate. Thus, thin-film layers and thin-film electronic devices overlie the substrate and the substrate surface. In addition, individual thin-film layers may overlie or underlie each other based on their proximity to the substrate. Overlying devices or thin-film layers are spaced farther from the substrate than corresponding underlying devices and layers, and closer to a fluid chamber overlying the devices.

Figure 7:
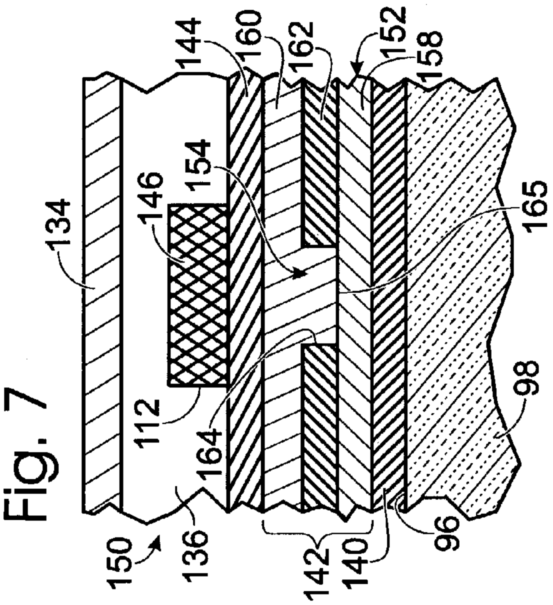
FIG. 7 is a sectional view of an embodiment of the thermal control zone of FIG. 6, in which a heating device and an overlying temperature sensor share a thin-film layer.

FIG. 7 shows a sectional view of an embodiment of a thermal control zone 150 of a biochip. Thermal control zone 150 includes the thermal control devices described above for thermal control zone 130 of FIG. 6. In particular, device layer 142 includes underlying and overlying thermal control devices, heater 152 and temperature sensor 154. Here, the thermal control devices are disposed in a "vertical" or stacked arrangement, that is, a line extending generally normal to surface 96 of substrate 98 intersects each of the devices. More generally, a substrate portion may have a vertical or stacked arrangement of any suitable electronic devices, including any of the devices described above or described below in Sections II and III. For example, thermally conductive layer 146 includes an electrode 112 that also overlies each of heater 152 and temperature sensor 154.

Heater 152 and temperature sensor 154 may share a thin-film layer. Heater 152 may be defined by an electrically resistive thin-film layer 158. Resistive thin-film layer 158 also may define part of temperature sensor 154 by forming a thermocouple junction with an overlying thermocouple layer 160. Resistive thin-film layer 158 and thermocouple layer 160 may be partially separated by an electrically insulating layer 162, formed with an opening 164 at which layers 158, 160 are in contact to form a thermocouple junction 165. In order to develop a characteristic, temperature-dependent voltage at thermocouple junction 165, layers 158, 160 may be formed of dissimilar materials, such as distinct metals or metal alloys. The temperature dependence of the voltage developed at thermocouple junction 165 may be known or determined empirically. (To simplify the presentation, electrical conductors extending to and/or from the heater and thermocouple are not shown here or in FIG. 8.)

Figure 8:
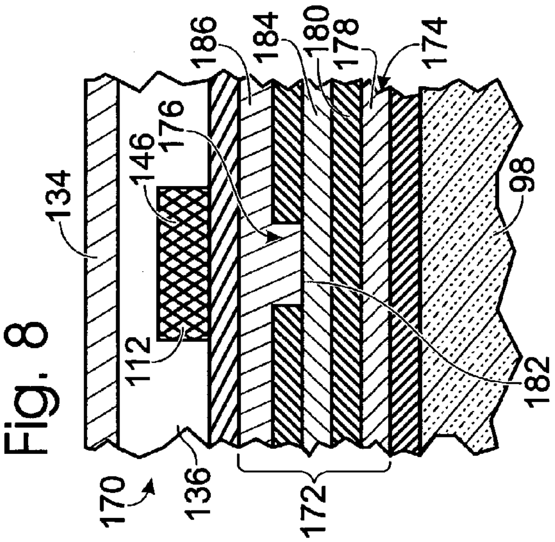
FIG. 8 is a sectional view of another embodiment of the thermal control zone of FIG. 6, in which a heating device and an overlying temperature sensor are formed by separate thin-film layers.

FIG. 8 shows a sectional view of another embodiment of a thermal control zone 170. In contrast to thermal control zone 150 of FIG. 7, thermal control zone 170 includes a device layer 172 in which thin-film layers are not shared between an underlying heater 174 and an overlying temperature sensor 176. Here, heater 174 is defined by resistive layer 178 and is spaced from sensor 176 by an insulating layer 180. Thermocouple junction 182 of the temperature sensor may be formed using two dissimilar layers, 184, 186, as described for thermocouple junction 165 above.

Primary temperature sensor 154 or 176, described above, may be coupled to a secondary temperature sensor (not shown). The secondary temperature sensor may function as a compensation circuit for comparison of the primary sensor temperature to a known or less variable temperature. Such a compensation circuit, also termed a "cold junction," may be electrically coupled to either layer that contributes to the primary temperature sensor or thermocouple junction, so that the thermocouple junction and compensation circuit are joined in series. With this arrangement, the combined voltage developed across the thermocouple junction and compensation circuit is proportional to the difference in temperature between these two sensors. The secondary temperature sensor may include, but is not limited to, another thermocouple, a thermistor (resistive temperature sensor), a degenerative band-gap sensor, a p-n junction, etc. The compensation circuit may sense ambient temperature or another temperature-controlled region of the biochip.

Both thermal control zones 150 and 170, with a vertical arrangement of heaters and sensors, may provide advantages over other heater/sensor arrangements. For example, heaters and sensors arrayed parallel to a substrate surface may be heating and sensing different fluid volumes. Accordingly, temperature control is less accurate. In other cases, heaters and sensors may be combined in a single resistive layer that functions as a resistive heating element and a thermistor. However, this provides a less-responsive and less accurate approach to temperature regulation. In general, thermal control zones 150, 170 may allow direct power regulation of thermal control devices that compensates for 1) variable parasitic electrical resistance on the biochip; 2) variations in material properties based on temperature, environment, and/or composition; and/or 3) noise from other sources, among others. In addition, thermal control zones 150, 170 may increase the lifetime of a resistive heater by avoiding excessive power input and thus excessively high resistor temperatures. Furthermore, zones 150, 170 may be used effectively for producing and maintaining a bubble for a predetermined time period, for example, to create a bubble valve. The heater may create a bubble quickly and then provide carefully controlled additional heating to maintain the bubble, without wasted power input to the heater.

Figure 9:
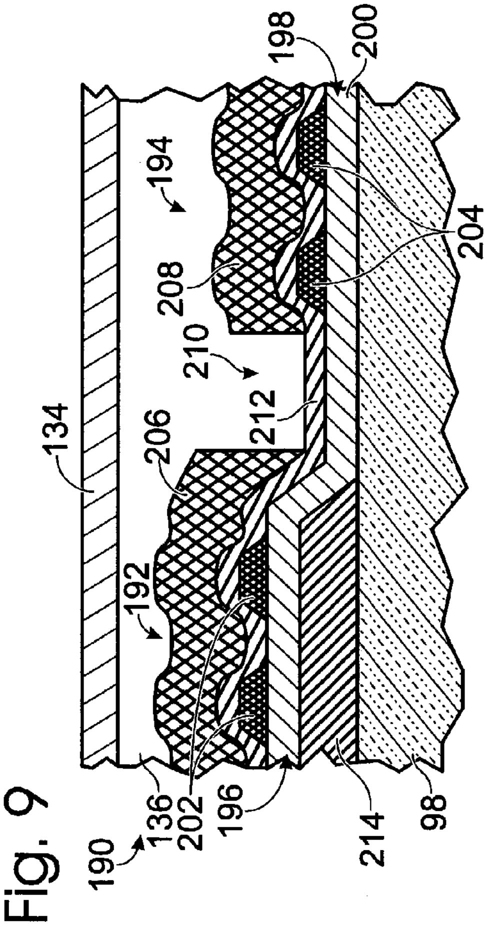
FIG. 9 is a fragmentary sectional view of an embodiment of a biochip having thermal isolation features that define distinct thermal zones.

FIG. 9 shows a schematic sectional view of a region of a biochip 190 having thermal isolation features that define distinct thermal zones 192, 194. Each thermal zone 192, 194 may include independently addressable heaters 196, 198 (or coolers), for example, as defined by resistive layer 200 and electrical conductors 202, 204, respectively. The conductors may form distinct circuits with the resistive layer in each thermal zone 192, 194 to heat distinct regions of fluid chamber 136 disposed over each heater. Thermal isolation between thermal zones 192, 194 may be promoted by features that act as thermal conductors and insulators. Thermal conduction may be provided by thermal spreaders 206, 208. The thermal spreaders may be formed of thermally (and electrically) conductive material, as described above for thermal spreader 146 of thermal zone 130 in FIG. 6. In addition, the thermal spreaders may be spaced from one another, as shown at 210, so that heat is efficiently conducted vertically, relative to the substrate surface, but less efficiently horizontally, between thermal zones 192, 194. Passivation layer 212, resistive layer 196, and other thin-film layers may extend between the thermal zones or may be discontinuous between the zones, as appropriate. Vertical insulation between thermal zones 192, 194 and substrate 98 may be controlled by an insulation layer 214, as described above for insulation layer 140 of FIG. 6. The insulation layer may be configured based on an average operating temperature of each thermal zone and/or by an average temperature differential between thermal zones. For example, thermal zone 192 may be configured as a higher temperature zone and thermal zone 194 as a lower temperature zone. In this case, more insulation may be beneficial under thermal zone 192, to direct a greater amount of heat into chamber 136. Accordingly, insulation layer 214 is present between substrate 98 and heater 196 in this thermal zone. By contrast, adjacent thermal zone 194 may lack insulation layer 214 under heater 198 or the insulation layer may be thinner. As a result, heat transferred from thermal zone 192 to thermal zone 194 may be shunted more efficiently to substrate 98 to avoid overheating zone 194.

Figure 10:
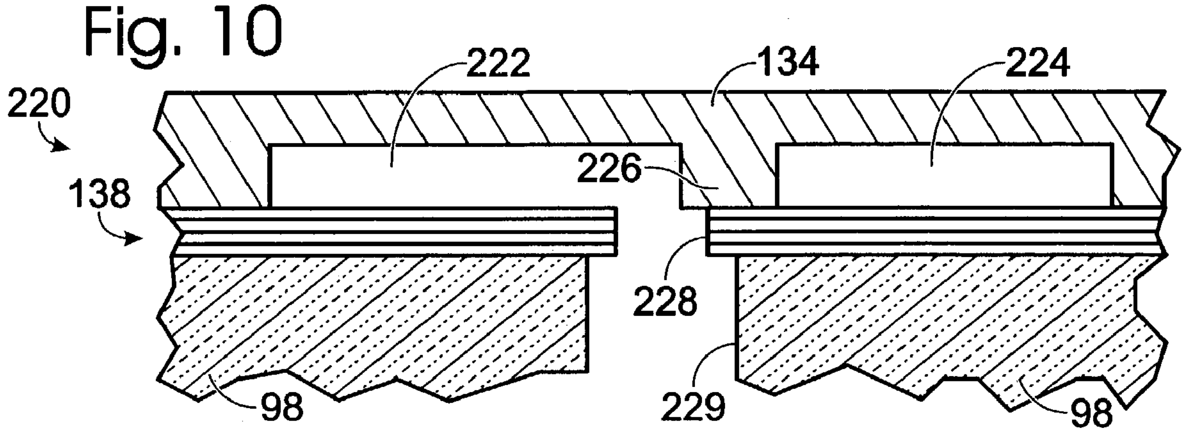
FIG. 10 is a fragmentary sectional view of an embodiment of a thermal isolation feature defined by a channel that extends into the substrate portion.

FIG. 10 shows a sectional portion of a biochip 220 having another type of thermal isolation feature. Fluid chambers 222, 224 are separated by a wall 226 defined by fluid barrier 134, but heat may be transferred between the chambers through the underlying substrate 98. Accordingly, thermal isolation may be provided by openings 228, 229 formed in thin-film layers 138 and substrate 98, respectively. The openings also may route fluid between fluid chambers. Further aspects of fluid routing pathways defined by the substrate and thin-film layers are described in more detail below in Section II.

Figure 11:
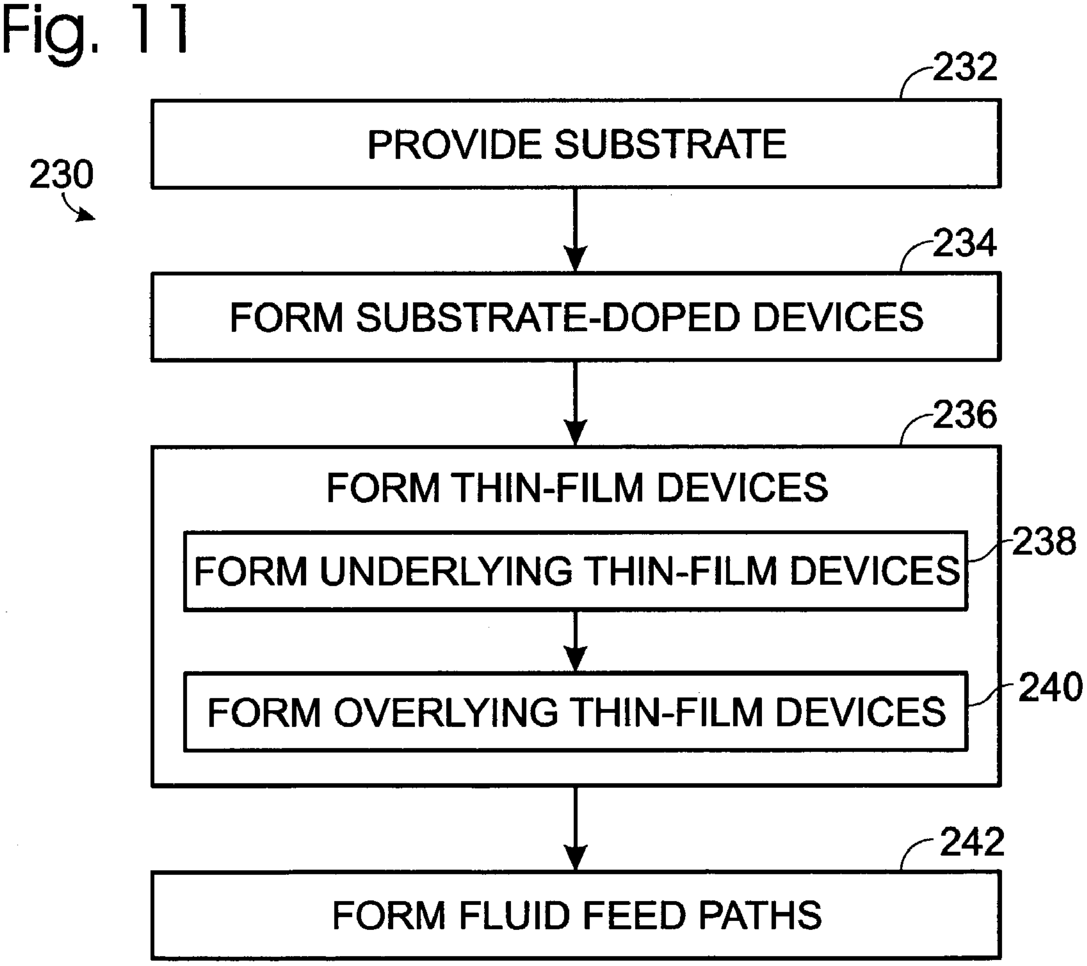
FIG. 11 is a flowchart showing an embodiment of a method of forming a substrate portion having underlying and overlying thin-film electronic devices.

FIG. 11 shows a method 230 of forming a biochip device for sample analysis.

A substrate is provided at 232. The substrate may be a semiconductor, such as silicon (for example, monocrystalline silicon), or may be an insulator, such as glass or a ceramic. Further examples of substrates that may be suitable are provided below in Section III.

Substrate-doped devices may be formed within the substrate, shown at 234. The substrate-doped devices generally are semiconductor devices formed by diffusion processes, for example, p- and n-doping. Semiconductor devices may include transistors, FETS, diodes, or other semiconductive devices. These semiconductor devices typically form higher level devices, such as switching devices, signal processing devices, analog devices, logic devices, and/or registers. Alternatively, as described below, the semiconductor devices may be formed by doping thin-film layers formed on the substrate rather than within the substrate.

Next, thin-film electronic devices (and features) may be formed on the substrate, overlying the substrate surface and the substrate-doped devices, shown at 236. The thin-film devices may be formed sequentially, with underlying devices formed first, shown at 238, followed by formation of overlying devices, shown at 240. For example, an underlying thin-film device such as a heater resistor may be formed first. This heater resistor may be configured to heat a portion of the substrate, to define the temperature of that portion of the substrate (and an overlying chamber holding fluid/sample). An overlying thin-film device, formed at 240, may be any device that is disposed adjacent to the sample to be processed, for example, a device that is based on electrical, magnetic, acoustic, or thermal design, as described above. Electronic devices fabricated in steps 238, 240 may share thin film layers, such as layer 158 of FIG. 7. In some embodiments, the thin-film electronic devices may include semiconductor devices. For example, a layer of polysilicon may be formed on the substrate (such as a glass substrate) and doped selectively. As used herein, thin-film electronic devices do not include other portions of the electronic circuit in which these devices function, such as conductive layers that extend to and from the thin-film electronic devices.

Fluid feed paths for routing fluid between fluid chambers of the biochip may be formed in the substrate and thin-film layers, as shown at 242. In some embodiments, the fluid feed paths may be formed at the same time as the thin-film devices. Further aspects of forming fluid feed paths for routing fluid are described below in Section II.

Figure 12:
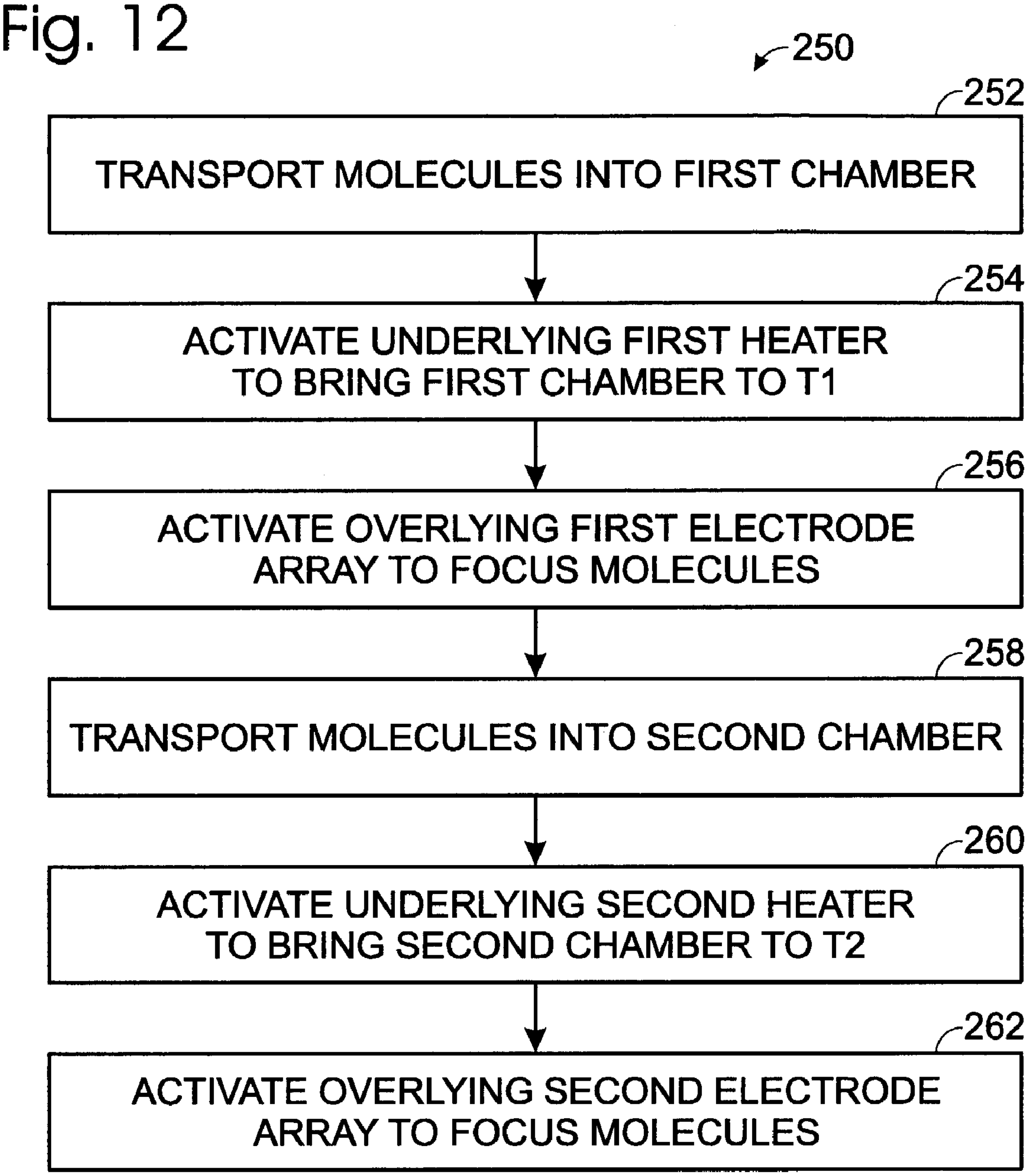
FIG. 12 is a flowchart showing an embodiment of a method for temperature-controlled processing of a sample in a plurality of chambers using underlying and overlying electronic devices.

FIG. 12 shows a method 250 for temperature-controlled processing of molecules (or sample) in a series of chambers of a biochip using underlying and overlying electronic devices. Molecules such as molecules of DNA or other nucleic acids molecules may be transported into a first chamber, shown at 252. A first closed-loop temperature control system including an underlying heater may be activated to bring the first chamber to a first temperature, shown at 254. This first temperature could be a first programmable temperature profile or even a sequence of different temperatures (such as the sequence utilized for DNA amplification). Either during or after this temperature sequencing, a first array of overlying electrodes may be activated to focus the molecules, shown at 256. This focusing may position the molecules within the chamber or move the molecules from the chamber. Alternatively, the focusing may move the molecules sequentially to different regions within the chamber as defined by electrodes of the first array. Steps 252, 254, and 256 may be repeated in a second chamber, shown at 258, 260, and 262, respectively, to serially process the molecules in each of the chambers.

II. Microfluidic Analysis with an Integrated Cartridge

This section describes a microfluidic system that includes an integrated microfluidic device, in the form of a cartridge, for processing and/or analysis of samples. This section also includes methods of using the device. Additional aspects of the cartridge and methods are described below in Section III. Furthermore, aspects of the cartridge and methods described below may be used on any of the samples described in Section IV and/or using any of the assays described in Section V.

Figure 13:
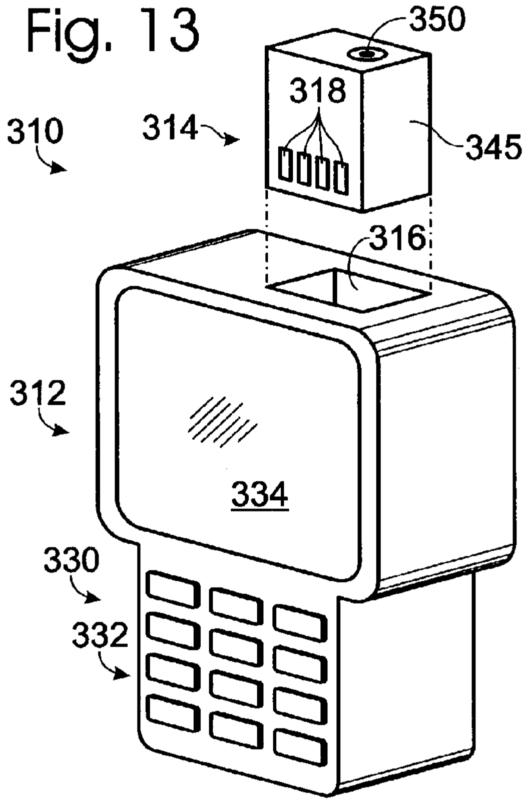
FIG. 13 is an isometric view of a microfluidic system having an integrated microfluidic cartridge aligned for mating with an exemplary control apparatus, the control apparatus being configured to power and control operation of the mated cartridge in sample processing and/or analysis, in accordance with an embodiment of the invention.
Figure 14:
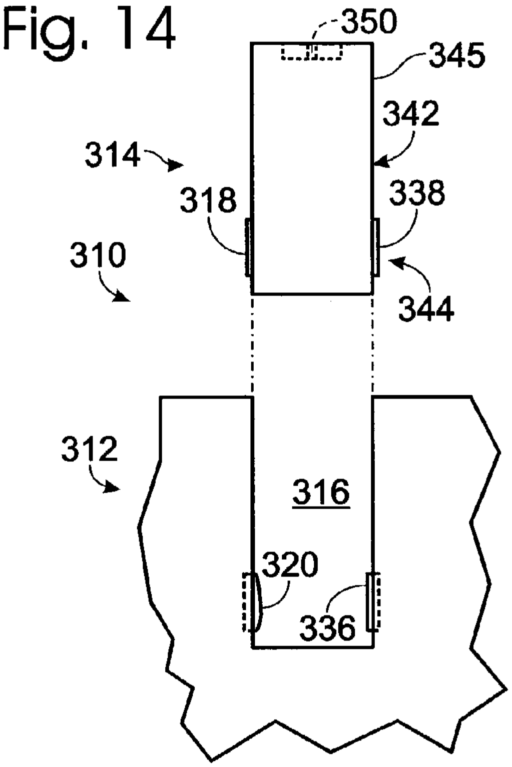
FIG. 14 is a fragmentary sectional view showing selected aspects of the cartridge and control apparatus of FIG. 13.
Figure 15:
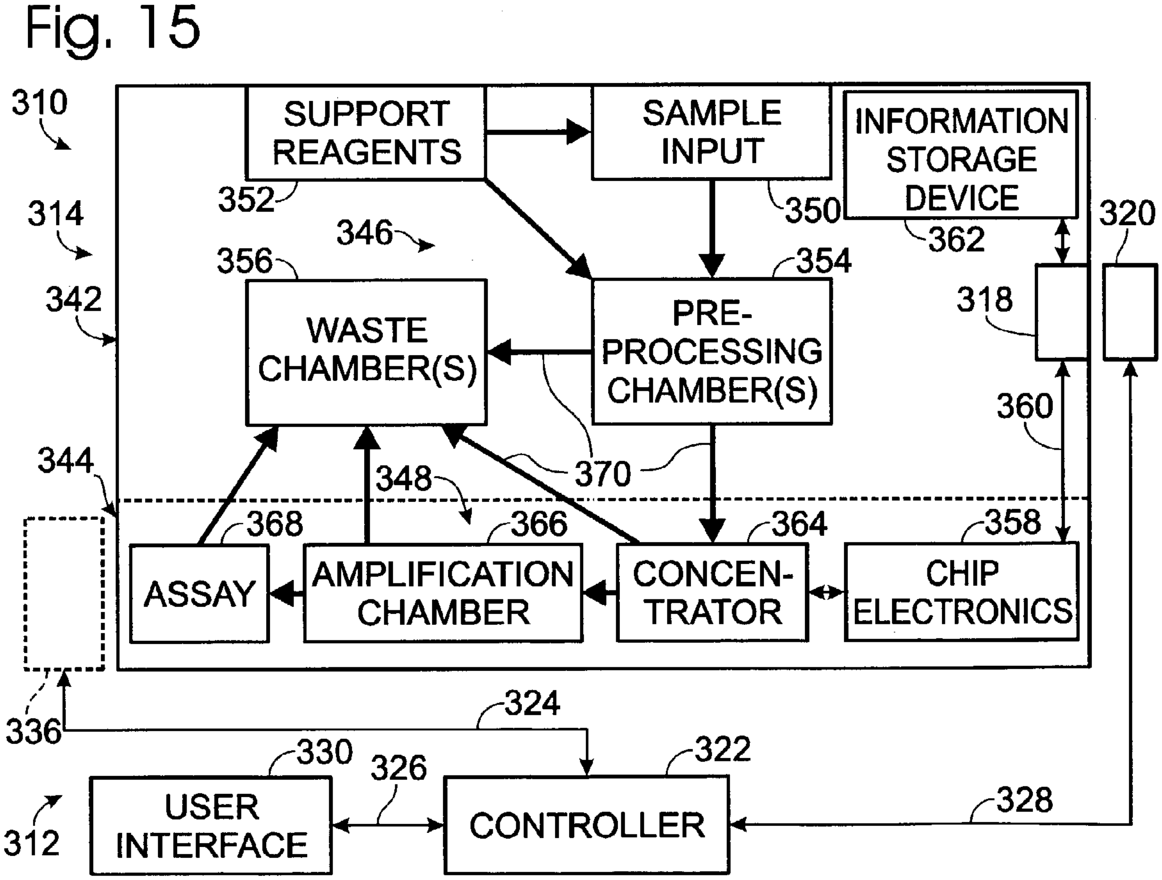
FIG. 15 is a schematic view of the cartridge and control apparatus of FIG. 13, illustrating movement of fluid, sample, electricity, digital information, and detected signals, in accordance with an embodiment of the invention.

FIGS. 13-15 show an embodiment of a microfluidic system 310 for processing and analysis of samples, particularly samples containing nucleic acids. FIGS. 13 and 14 show isometric and sectional views, respectively, of the system. FIG. 15 is a schematic representation of system 310, illustrating selected aspects of the system. System 310 includes a control apparatus 312 and an integrated cartridge 314 that is configured to be electrically coupled to control apparatus 312. In FIGS. 13 and 14, cartridge 314 is shown aligned and positioned to be received by, and thus installed in, the control apparatus. As used herein, the term "cartridge" describes a small modular unit designed to be installed in a larger control apparatus. As used herein, the term "installed in" indicates that the cartridge has been mated properly with the control apparatus, generally by at least partially inserting the cartridge in the control apparatus. Accordingly, control apparatus 312 may include a recess 316 that matingly receives cartridge 314, for example, by coupling through an electrical interface formed through contact between electrical contact pads 318 on cartridge 314 and corresponding contact structures 320 positioned in recess 316 (see FIG. 14). Alternatively, control apparatus 312 may interface electrically with cartridge 314 conductively, capacitively, and/or inductively using any other suitable structures. Control apparatus 312 may have any suitable size, for example, small enough to be held by hand, or larger for use on a bench-top or floor.

Control apparatus 312 is configured to send and receive control signals to cartridge 314, in order to control processing in cartridge 314. In some embodiments, cartridge 314 includes detection electronics. With such electronics, control apparatus receives signals from cartridge 314 that are utilized by control apparatus 312 to determine an assay result. The control apparatus may monitor and control conditions within the cartridge (such as temperature, flow rate, pressure, etc.), either through an electrical link with electronic devices within the cartridge and/or via sensors that interface with the cartridge. Alternatively, or in addition, control apparatus 312 may read information from an information storage device on the cartridge (see below) to ascertain information about the cartridge, such as reagents contained by the cartridge, assays performed by the cartridge, acceptable sample volume or type, and/or the like. Accordingly, control apparatus 312 generally provides some or all of the input and output lines described below in Section III, including power/ground lines, data input lines, fire pulse lines, data output lines, and/or clock lines, among others.

Control apparatus 312 may participate in final processing of assay data, or may transfer assay data to another device. Control apparatus 312 may interpret results, such as analysis of multiple data points (for example, from binding of a test nucleic acid to an array of receptors (see below)), and/or mathematical and/or statistical analysis of data. Alternatively, or in addition, control apparatus 312 may transfer assay data to another device, such as a centralized entity. Accordingly, control apparatus 312 may codify assay data prior to transfer.

Control apparatus 312 includes a controller 322 that processes digital information (see FIG. 15). The controller generally sends and receives electrical signals to coordinate electrical, mechanical, and/or optical activities performed by control apparatus 312 and cartridge 314, shown by double-headed arrows at 324, 326, 328.

Control apparatus 312 may communicate, shown at 326 in FIG. 15, with a user through a user interface 330. The user interface may include a keypad 332 (see FIG. 13), a screen 334, a keyboard, a touchpad, a mouse, and/or the like. The user interface typically allows the user to input and/or output data. Inputted data may be used, for example, to signal the beginning of sample processing, to halt sample processing, to input values for various processing parameters (such as times, temperatures, assays to be performed, etc.), and/or the like. Outputted data, such as stage of processing, cartridge parameters, measured results, etc. may be displayed on screen 334, sent to a printing device (not shown), stored in onboard memory, and/or sent to another digital device such as a personal computer, among others.

Control apparatus 312 also may include one or more optical, mechanical and/or fluid interfaces with cartridge 314 (see FIGS. 14 and 15). An optical interface 336 may send light to and/or receive light from cartridge 314. Optical interface 336 may be aligned with an optically transparent region 338 of cartridge 314 when the cartridge mates with control apparatus 312 (see FIG. 14 and discussion below). Accordingly, optical interface 336 may act as a detection mechanism having one or more emitters and detectors to receive optical information from the cartridge. Such optical information may relate to assay results produced by processing within the cartridge. Alternatively, or in addition, optical interface 336 may be involved in aspects of sample processing, for example, providing a light source for light-catalyzed chemical reaction, sample disruption, sample heating, etc. In any case, operation of optical interface 336 may be directed by controller 322, with corresponding measurements received by controller 322, as shown at 324 in FIG. 15, thus allowing measurements from optical interface 336 to be processed and stored electronically. Control apparatus 312 may include one or more electronically controlled mechanical interfaces (not shown), for example, to provide or regulate pressure on the cartridge. Exemplary mechanical interfaces of control apparatus 312 may include one or more valve actuators, valve regulators that control valve actuators, syringe pumps, sonicators, and/or pneumatic pressure sources, among others. In some embodiments, the control apparatus may include one or more fluid interfaces that fluidly connect the control apparatus to the cartridge. For example, the control apparatus may include fluid reservoirs that store fluid and deliver the fluid to the cartridge. However, control apparatus 312 shown here is not configured to couple fluidly to cartridge 314. Instead, in this embodiment, cartridge 314 is a closed or isolated fluid system during operation, that is, a fluid network in which fluid is not substantially added to, or removed from, the network after the sample is received. Further aspects of optical detection, and mechanical and fluid interfaces in microfluidic systems are described below in Section III.

Cartridge 314 may be configured and dimensioned as appropriate. In some embodiments, cartridge 314 is disposable, that is, intended for one-time use to analyze one sample or a set of samples (generally in parallel). Cartridge 314 may have a size dictated by assays to be performed, fluid volumes to be manipulated, nonfluid volume of the cartridge, and so on. However, cartridge 314 typically is small enough to be easily grasped and manipulated with one hand (or smaller).

Cartridge 314 typically includes at least two structurally and functionally distinct components: a fluid-handling portion 342 and an assay (or chip) portion 344. Fluid-handling portion may include a housing 345 that forms an outer mechanical interface with the control apparatus, for example, to operate valves and pumps. Housing may define the structure of interior fluid compartments. Housing 345 also substantially may define the external structure of the cartridge and thus may provide a gripping surface for handling by a user. Assay portion 344 may be attached fixedly to fluid-handling portion 342, for example, on an exterior or interior surface of fluid-handling portion 342. External attachment of assay portion 344 may be suitable, for example, when results are measured optically, such as with optical interface 336. Internal and/or external attachment may be suitable when results are measured electrically, or when fluid-handling portion 342 is optically transparent. Assay portion 344 also typically is connected fluidically to fluid-handling portion 342, as described below, to allow exchange of fluid between these two portions.

Fluid-handling portion 342 thus may be configured to receive fluids from external the cartridge, store the fluids, and deliver the fluids to fluid compartments in both fluid-handling portion 342 and assay portion 344, for example, by mechanically driven fluid flow. Accordingly, fluid-handling portion may define a fluid network 346 with a fluid capacity (volume) that is substantially larger than a corresponding fluid network (or fluid space) 348 of assay portion 344. Each fluid network may have one fluid compartment, or more typically, plural fluidically connected fluid compartments, generally chambers connected by fluid conduits.

Fluid-handling portion 342 includes a sample input site or port 350. Sample input site 350 is generally externally accessible but may be sealable after sample is introduced to the site. Cartridge 314 is shown to include one sample input site 350, but any suitable number of sample input sites may be included in fluid-handling portion 342.

Fluid-handling portion 342 also includes one or more reagent reservoirs (or fluid storage chambers) 352 to carry support reagents (see FIG. 15). Reagent reservoirs 352 each may be externally accessible, to allow reagent loading after the fluid-handling portion has been manufactured. Alternatively, some or all of reagent reservoirs 352 may be loaded with reagent during manufacturing. Support reagents generally include any fluid solution or mixture involved in sample processing, analysis, and/or general operation of cartridge 314.

Fluid-handling portion 342 also may include one or more additional chambers, such as a pre-processing chamber(s) 354 and/or a waste chamber(s) 356. Pre-processing chamber(s) 354 and waste chamber(s) 356 may be accessible only internally, for example, through sample input site 350 and/or reagent reservoirs 352, or one or more may be externally accessible to a user. Pre-processing chamber(s) are fluid passages configured to modify the composition of a sample, generally in cooperation with fluid flow. For example, such passages may isolate analytes (such as nucleic acids) from inputted sample, that is, at least partially separating analyte from waste material or a waste portion of the sample, as described below. Further aspects of fluid-handling portions are described below in Section III.

In a preferred embodiment, the fluid-handling portion 342 and in fact all fluid compartments of cartridge 314 are sealed against customer access, except for the sample input 350. This sealing may operate to avoid potential contamination of reagents, to assure safety, and/or to avoid loss of fluids from fluid-handling portion 342. Some of the reagents and/or processing byproducts resultant from pre-processing and/or additional processing may be toxic or otherwise hazardous to the user if the reagents or byproducts leak out and/or come in contact with the user. Furthermore, some of the reagents may be very expensive and hence in minimal supply in cartridge 314. Thus, the preferred implementation of cartridge 314 is an integral, sealed, disposable cartridge with a fluid interface(s) only for sample input 350, an electrical interface 318, and optional mechanical, optical and/or acoustic interfaces.

Assay portion 344 is configured for further processing of nucleic acid in fluid network 348 after nucleic acid isolation in fluid-handling portion 342. Accordingly, assay portion 344 relies on electronics or electronic circuitry 358, which may include thin-film electronic devices to facilitate controlled processing of nucleic acids received from fluid-handling portion 342. By contrast, bulk fluid flow in assay portion 344 may be mediated by mechanically driven flow of fluid from fluid-handling portion 342, through assay portion 344, and back to portion 342.

Electronic circuitry 358 of the assay portion may include thin-film electronic devices to modify and/or sense fluid and/or analyte properties. Exemplary roles of such thin-film devices may include concentrating the isolated nucleic acids, moving the nucleic acids to different reaction chambers and/or assay sites, controlling reaction conditions (such as during amplification, hybridization to receptors, denaturation of double-stranded nucleic acids, etc.), and/or the like (see Section III also). The thin-film devices may be operably coupled to any regions of fluid network 348. Operably coupled may include direct contact with fluid, for example, with electrodes, or spaced from fluid by one or more insulating thin-film layers (see below). In either case, the operably disposed devices may be disposed near the surface of the substrate (see below). Further aspects of the electronic circuitry, thin-film layers, and substrates are described below in this section and in Section III.

Electronic circuitry 358 of assay portion 344 is controlled, at least in part, by electrically coupling to control apparatus 312. For example, as shown in FIG. 15, controller 322 may be coupled, shown at 328, via contact structures 320, with contact pads 318 disposed on fluid-handling portion 342 of cartridge 314. In turn, contact pads 318 may be electrically coupled with electronic circuitry 358, as shown at 360. One or more additional integrated circuits, or interface circuits, may be coupled electrically to contact pads 318 intermediate to circuitry 358, for example, to allow circuitry 358 to have greater complexity and/or to minimize the number of distinct contact pads (or sites) on cartridge 314. Thus, the contact pads alone or in combination with the interface circuits form an interconnect circuit that electrically couples the electronics to the controller when the cartridge is installed in the control apparatus. Contact pads also may couple to an electronic information storage device 362 carried in cartridge 314, for example, in fluid-handling portion 342, as shown. The information storage device may store information that relates to the cartridge, such as fluid network configurations, reservoir contents, assay capabilities, assay parameters, and/or the like. In alternative embodiments, contact pads 318 or other electrical coupling structures may be disposed on assay portion 344 instead of, or in addition to, being included in fluid-handling portion 342.

Assay portion 344 typically is configured to carry out nucleic acid processing in fluid network 348, at least partially by operation of circuitry 358. Here, fluid network 348 is shown to include three functional regions: a concentrator 364, an amplification chamber 366, and an assay chamber 368. As described in more detail below, each of these functional regions may include electrodes to facilitate nucleic acid retention and release (and thus concentration), and/or directed movement toward a subset of the electrodes. Concentrator 364 and chambers 366, 368 may be defined by distinct compartments/passages, for example, as a serial array of compartments, as shown. Alternatively, these functional regions may be partially or completely overlapping, for example, with all provided by one chamber.

The temperature of each chamber (or of regions within each chamber) may be controlled independently (see Section I above). Accordingly, each chamber or chamber region may be at a different temperature, to provide, for example, optimal sample processing in each chamber or region. The temperature may be fixed, such as for a nucleic acid hybridization reaction, or variable, such as for thermal cycling during nucleic acid amplification.

Concentrator 364 is configured to concentrate nucleic acids received from pre-processing chamber 354. Electrodes of concentrator 364 may be electrically biased positively, while allowing fluid to pass from fluid-handling portion 342, through the concentrator, and back to waste chamber 356 in fluid-handling portion 342. Accordingly, concentrator 364 may be connected fluidically to fluid-handling portion 342 at plural discrete sites (see FIGS. 17-23), allowing the concentrator to serve as a conduit. The conduit may allow transfer of a fluid volume (between two fluid-handling portion reservoirs) that is substantially larger than the fluid capacity of the concentrator. This processing step removes fluid, and may partially purify the nucleic acids by removing material that is positively charged, uncharged, or weakly negatively charged, among others.

Amplification chamber 366 may be used to copy one or more target nucleic acid (or nucleic acids) from among the concentrated nucleic acids, using an amplification reaction to increase assay sensitivity. An amplification reaction generally includes any reaction that increases the total number of molecules of a target nucleic acid (or a region contained within the target species), generally resulting in enrichment of the target nucleic acid relative to total nucleic acids. Enzymes that replicate DNA, transcribe RNA from DNA, and/or perform template-directed ligation of primers, may mediate the amplification reaction. Dependent upon the method and the enzymes used, amplification may involve thermal cycling (for example, polymerase chain reaction (PCR) or ligase chain reaction (LCR)) or may be isothermal (for example, strand-displacement amplification (SDA) or nucleic acid sequence-based amplification (NASBA)). With any of these methods, temperature control in chamber 366 may be determined by heaters, such as thin-film heaters included in circuitry 358. Nucleic acids may be labeled during amplification to facilitate detection, for example, by incorporation of labeled primers or nucleotides. Primers or nucleotides may be labeled with dyes, radioisotopes, or specific binding members, as described below in Section III and listed in Table 1. Alternatively, nucleic acids may be labeled in a separate processing step (for example, by terminal transferase, primer extension, affinity reagents, nucleic acid dyes, etc.), or prior to inputting the sample. Such separate labeling may be suitable, for example, when the amplification step is omitted because a sufficient amount of the target nucleic acid is included in the inputted sample.

Assay chamber 368 may perform a processing step that separates or distinguishes nucleic acids according to specific sequence, length, and/or presence of sequence motifs. In some embodiments, the assay chamber includes one or plural specific receptors for nucleic acids. Receptors may include any agent that specifically binds target nucleic acids. Exemplary receptors may include single-stranded nucleic acids, peptide nucleic acids, antibodies, chemical compounds, polymers, etc. The receptors may be disposed in an array, generally immobilized at defined positions, so that binding of a target nucleic acid to one of the receptors produces a detectable signal at a defined position(s) in the assay chamber. Accordingly, when amplification is used, amplified nucleic acids (targets) contact each of the receptors to test binding. A receptor array may be disposed proximate to electrodes that concentrate the targets electrically over receptors of the array, as described further below. In alternative embodiments, the assay chamber may separate target nucleic acids according to size, for example, using electrophoresis and/or chromatography. Alternatively, or in addition, the assay chamber may provide receptors that are not immobilized, such as molecular beacon probes and/or may provide a site for detection without receptors.

Optical interface 336 may measure sample processing at any suitable position of assay portion 344. For example, optical interface may include separate emitter-detector pairs for monitoring amplification of nucleic acids in amplification chamber 366, and for detecting binding and/or position of amplified nucleic acids after processing in assay chamber 368, as described above. Alternatively, or in addition, the optical interface may monitor fluid movement through chip fluid network 348.

FIG. 15 shows exemplary directions of fluid movement (reagents and/or sample) through fluid networks 346 and 348 during sample processing, indicated by thickened arrows, as shown at 370. Generally, fluid flows from reagent reservoirs 352 through sample input site 350 and pre-processing chamber(s) 354 to waste chamber(s) 356 and assay portion 344 (see below). Fluid that enters assay portion 344 from fluid-handling portion 342 may flow back to waste chamber(s) 356 or may be moved to other fluid compartments in the assay portion.

Figure 16:
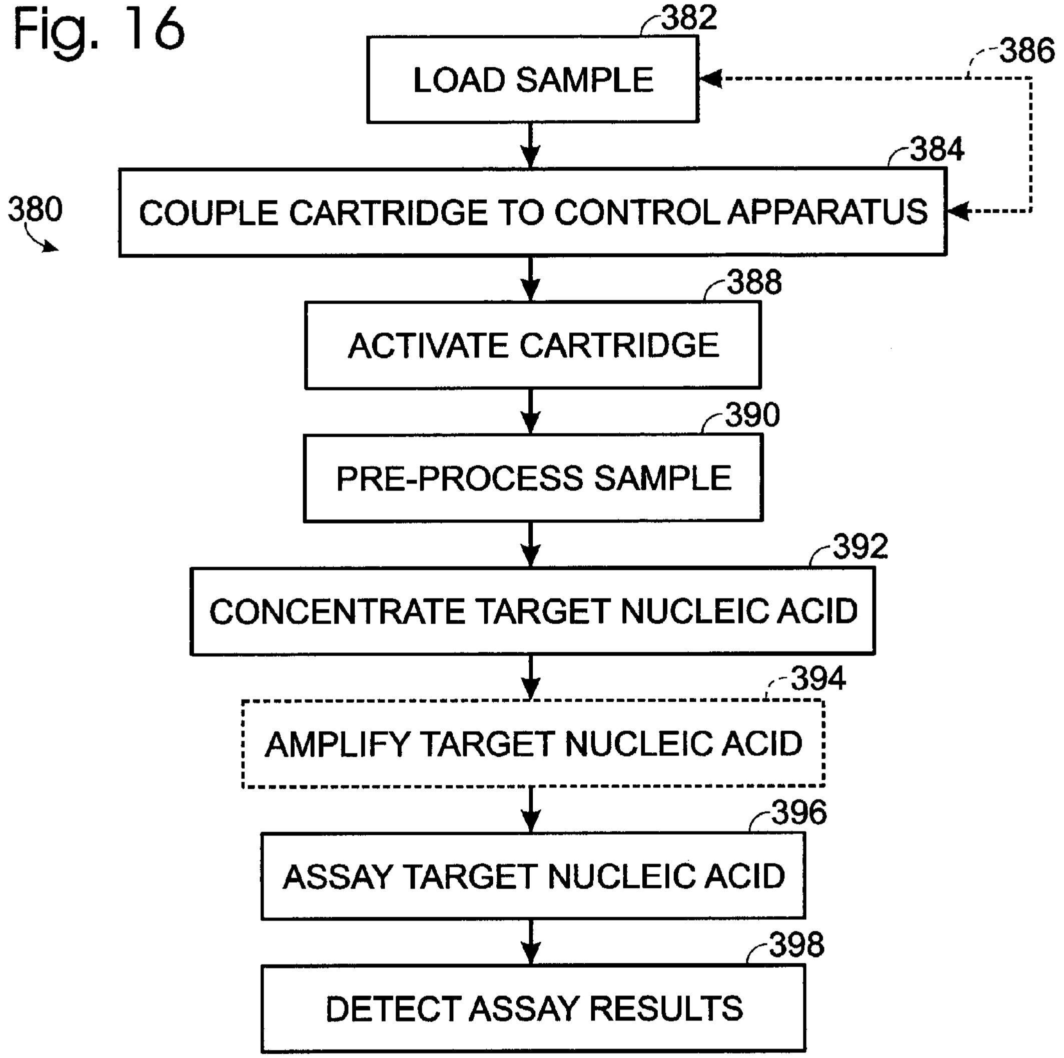
FIG. 16 is a flowchart illustrating an exemplary method of operation of the cartridge and control apparatus of FIG. 13, in accordance with an embodiment of the invention.

FIG. 16 shows a flowchart illustrating an exemplary method 380 for operation of cartridge 314 with control apparatus 312 to analyze target nucleic acid(s) in a sample. First, sample may be introduced (loaded) at sample input site 350 of cartridge 314, for example, by injection, as shown at 382. Next, the cartridge with its sample may be electrically coupled to control apparatus 314, as shown at 384, for example, by mating the cartridge with recess 316 for conductive contact. As indicated at 386, such loading and coupling may be performed in reverse order, that is, the sample may be introduced into the cartridge after it has been coupled to the control apparatus. The cartridge then may be activated to initiate processing, as shown at 388. The cartridge may be activated by input from a user through user interface 330, by coupling the cartridge to the control apparatus, by introducing a sample, and/or the like. After activation, the sample is pre-processed, as shown at 390. Pre-processing typically moves the sample to pre-processing chamber 354, and treats the sample to release and isolate nucleic acids, when necessary, as described further below. The isolated nucleic acids are moved to concentrator 364 in assay portion 344, generally by mechanically driven flow, and concentrated, as shown at 392. The concentrated nucleic acids may be amplified selectively, if needed, as shown at 394, with use of primers targeted to nucleic acids of interest.

Next, the amplified nucleic acids may be assayed, for example, by contacting a receptor or receptor array with the amplified nucleic acids, as shown at 396. Assay results then may be detected optically and/or electrically, as shown at 398.

Figure 17:
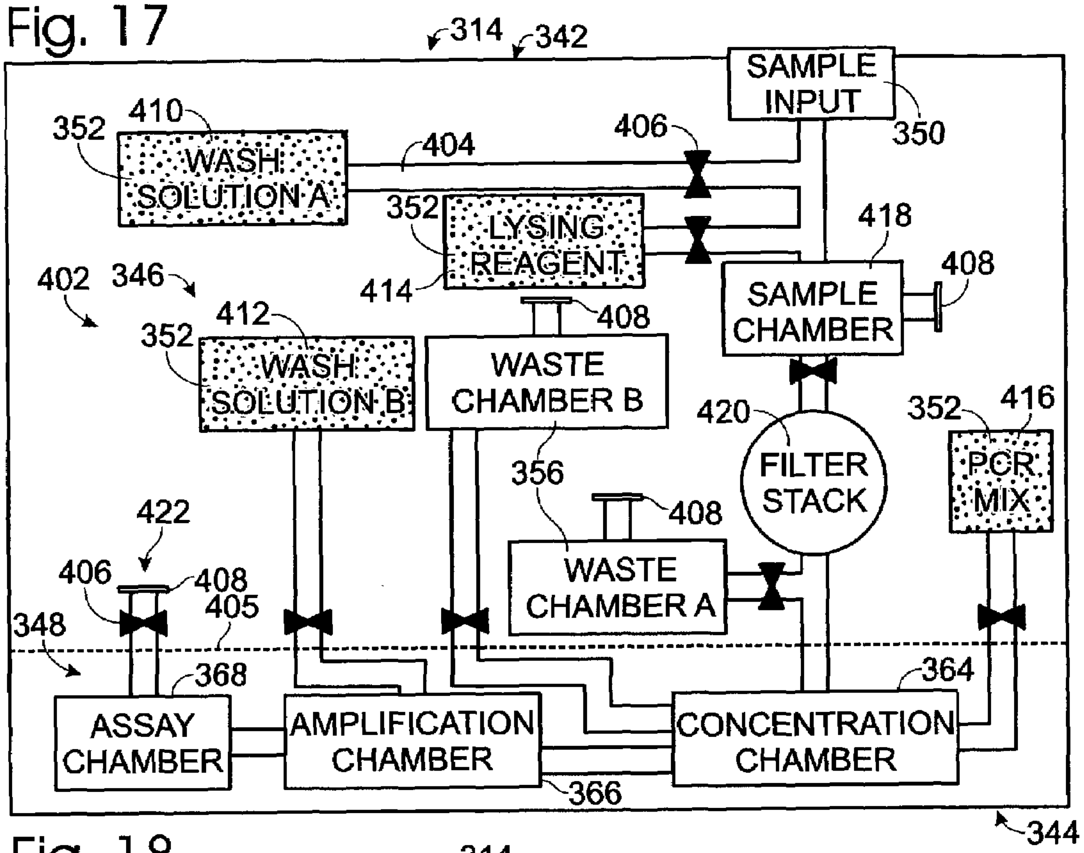
FIG. 17 is a more detailed schematic view of the cartridge of FIGS. 13 and 15, illustrating a fluid network for carrying out the method of FIG. 16.

FIG. 17 shows a more detailed representation of an exemplary self-contained fluid network 402 formed by interconnected fluid networks 346, 348 in fluid-handling portion 342 and assay portion 344 of cartridge 314, respectively. Chambers are represented as rectangles, or by a circle. Channels 404 that interconnect the chambers are represented by parallel lines. As shown, channels 404 fluidly connect fluid-handling portion 342 with assay portion 344 at positions where the channels cross an interface 405 between the two portions. Valves 406 are represented by solid "bowties" (closed valves) or by unfilled bowties (open valves; see below). Valves typically are electrically activated, and thus may be electrically coupled (not shown) to control apparatus 312. Alternatively, or in addition, valves may be mechanically operated by electrically activated valve actuators/regulators on control apparatus 312. Exemplary valves include solenoid valves and single use valves. Gas-selective vents 408 are represented by thin rectangles on terminated channels (see the vent on assay chamber 368, for example). Suitable valves and vents are described further in Section III.

FIG. 17 shows the cartridge ready to receive a sample and to be activated. Accordingly, the cartridge has been preloaded with reagents in reagent reservoirs 352, as shown by stippling to represent fluid. Preloaded reagent reservoirs 352 may carry wash solutions 410, 412 of suitable pH, buffering capacity, ionic strength, solvent composition, etc. One or more reservoirs 352 also may carry a lysing reagent 414, which may include, for example, a chaotropic agent, a buffer of high or low ionic strength, one or more ionic or nonionic detergents, an organic solvent(s), and/or the like. Furthermore, one or more reservoirs 352 may include an amplification mix, such as PCR mix 416, or any other mixture that includes one or more amplification reagents. In general, any nucleic acid(s) that selectively hybridizes to the nucleic acid(s) of interest may be an amplification reagent.

PCR mix 416 generally includes a suitable buffer, $Mg^{+2}$, specific primers for selective amplification of target nucleic acid(s), dNTPs, a heat stable polymerase, and/or the like. One or more primers and/or dNTPs may be labeled, for example with a dye or biotin, as described above. PCR mix 416 may be replaced with any other suitable amplification mixture, based on the amplification method implemented by the cartridge. Furthermore, in order to analyze RNA, PCR mix may include a reverse transcriptase enzyme. Alternatively, a separate reservoir may provide reagents to carry out synthesis of complementary DNA using the RNA as a template, generally prior to amplification.

Reagent reservoirs 352 may be configured to deliver fluid based on mechanically driven fluid flow. For example, reagent reservoirs 352 may be structured as collapsible bags, with a spring or other resilient structure exerting a positive pressure on each bag. Alternatively, reagent reservoirs 352 may be pressurized with a gas. Whatever the mechanism of pressurization, valve 406 may be operated to selectively control delivery of reagent from each reservoir. Section III describes additional exemplary mechanisms to produce mechanically driven fluid flow.

Cartridge 314 includes internal chambers for carrying out various functions. Internal chambers include waste chambers 356, in this case, two waste chambers, designated A and B. Waste chambers 356 receive fluids from reagent reservoirs 352 (and from sample input 350) and thus may include vents 408 to allow gas to be vented from the waste chambers. Internal chambers (passages) may include a sample chamber 418, a filter stack 420, and chip chambers 364, 366, 368. Sample chamber 418 and filter stack 420 are configured to receive and pre-process the sample, respectively, as described further below. Assay chamber 368 may be vented by a regulated vent 422, that is, a valve 406 that controls a vent 408. Some or all of the internal chambers and/or channels 404 may be primed with suitable fluid, for example, as part of cartridge manufacture. In particular, chambers/channels of assay portion 344 may be primed. Correspondingly, some chambers and/or channels may be unprimed prior to cartridge activation.

Figure 18:
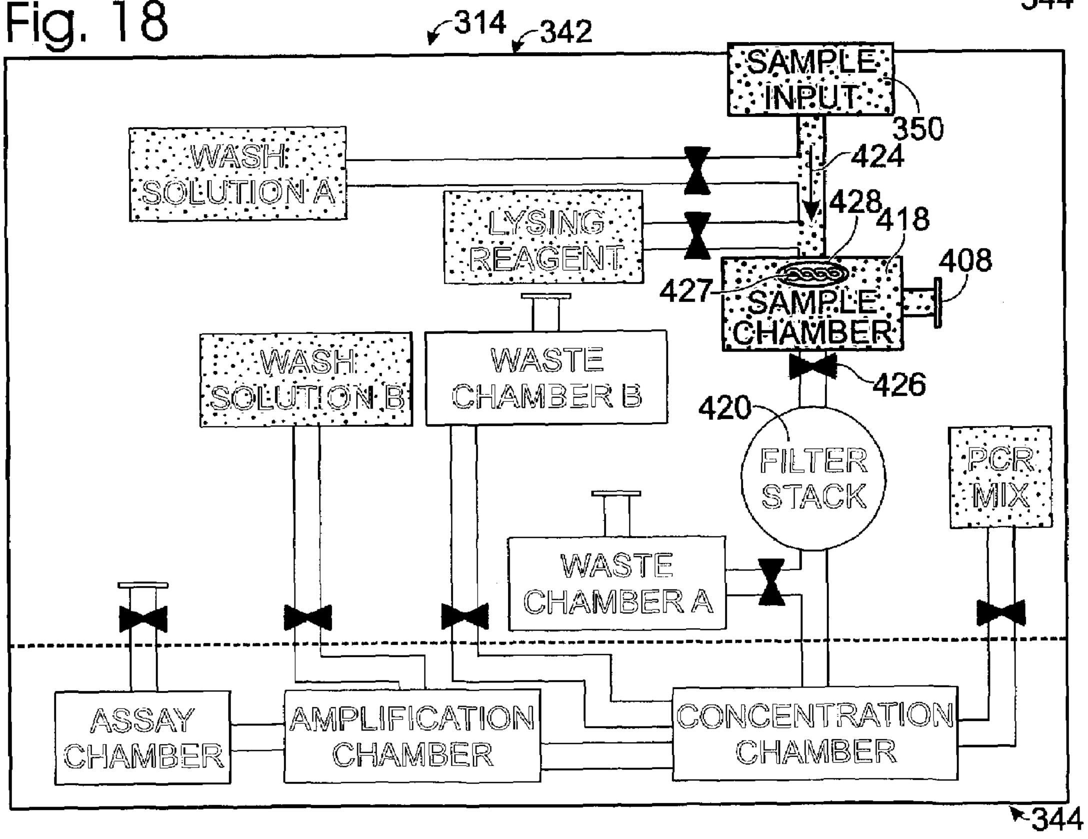
FIG. 18 is a schematic view emphasizing active regions of the cartridge of FIG. 17 during sample loading.

FIG. 18 shows active regions of fluid movement in cartridge 314 during sample loading. Here, and in FIGS. 19-22, heavy stippling indicates active regions, whereas light stippling indicates reagents or waste in reservoirs elsewhere in the cartridge. A sample, such as a liquid-based sample, is loaded at sample input site 350 and received by sample chamber 418, generally following a path indicated at 424. The volume of sample that may be loaded is limited here by a vent 408 on sample chamber 418, and by the capacity of sample chamber 418. Once sample chamber 418 is filled, vent 408 may provide a back pressure that limits introduction of additional sample. Alternatively, or in addition, an electrical or optical fluid sensor (not shown) may be placed within or around sample chamber 418 to signal when sample capacity is reached. A valve 426 downstream from sample chamber 418 may prevent the sample from flowing to filter stack 420 at this time, or the sample may be loaded directly onto the filter stack from sample input site 350, for example, by venting through waste chamber A.

The sample may be in any suitable form, for example, any of the samples described above in Section IV. However, the cartridge embodiment described here is configured to analyze nucleic acids 427, so samples generally contain nucleic acids, that is, DNA and/or RNA, or be suspected of carrying nucleic acid. Nucleic acids 427 may be carried in tissue or biological particles, may be in an extract from such, and/or may be partially or fully purified. Cells 428, viruses, and cell organelles are exemplary biological particles. The loaded sample volume may be any suitable volume, based on sample availability, ease of handling small volumes, target nucleic acid abundance in the sample, and/or cartridge capacity, etc.

Figure 19:
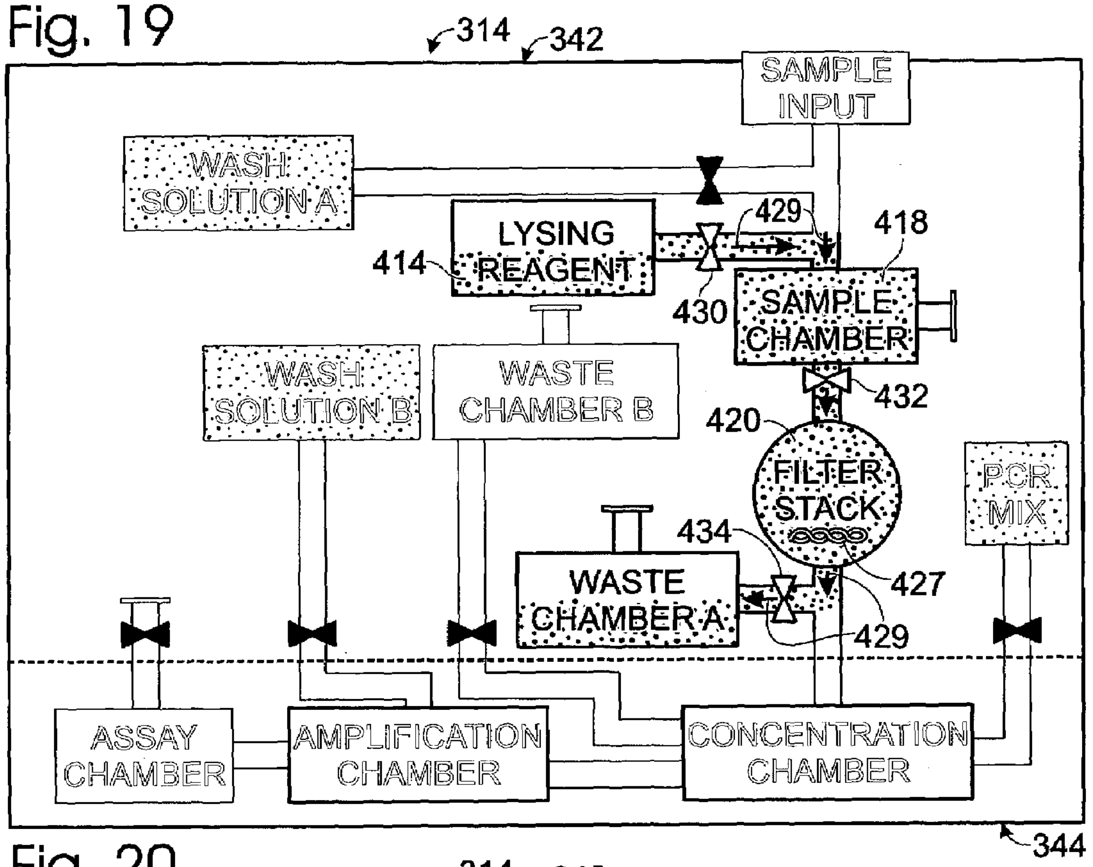
FIG. 19 is a schematic view emphasizing active regions of the cartridge of FIG. 17 during sample processing to isolate nucleic acids on a filter stack.

FIG. 19 shows active regions of fluid movement in cartridge 314 during sample pre-processing. Lysing reagent 314 may be introduced along path 429 by opening valves 430, 432, 434. The lysing reagent thus typically carries the sample with its nucleic acids 427 from sample chamber 418 to filter stack 420. Excess fluid may be carried to waste chamber A. The filter stack generally may be configured to perform nucleic acid isolation, that is, at least partial separation from sample waste material, through any or all of at least three functions: particle filtration, nucleic acid release from the sample, and retention of released nucleic acid. Waste material is defined here as any sample-derived component, complex, aggregate or particulate, among others, that does not correspond to the nucleic acid of interest. Exemplary waste material may include cell or viral debris, unbroken cells or virus particles, cell membranes, cytoplasmic components, soluble non-nucleic acid materials, insoluble non-nucleic acid materials, nucleic acids that are not of interest, and/or the like. Waste material also may be sample-derived fluid, removal of which concentrates the nucleic acids.

Filtration is any size selection process carried out by filters that mechanically retain cells, particles, debris and/or the like. Accordingly, the filter stack may localize sample particles (cells, viruses, etc.) for disrupting treatment and also may remove particulates that might interfere with downstream processing and/or fluid flow in cartridge fluid network 402. Suitable filters for this first function may include small-pore membranes, fiber filters, narrowed channels, and/or so on. One or more filters may be included in the filter stack. In some embodiments, the filter stack includes a series of filters with a decreasing exclusion limit within the series along the direction of fluid flow. Such a serial arrangement may reduce the rate at which filters become clogged with particles.

The sample retained on filter stack 420 may be subjected to a treatment that releases nucleic acids 427 from an unprocessed and/or less accessible form in the sample. Alternatively, or in addition, the releasing treatment may be carried out prior to sample retention on the filter stack. The treatment may alter the integrity of cell surface, nuclear, and/or mitochondrial membranes and/or may disaggregate subcellular structures, among others. Exemplary releasing treatments may include changes in pressure (for example, sonic or ultrasonic waves/pulses or a pressure drop produced by channel narrowing as in a French press); temperature shift (heating and/or cooling); electrical treatment, such as voltage pulses; chemical treatments, such as with detergent, chaotropic agents, organic solvents, high or low salt, etc.; projections within a fluid compartment (such as spikes or sharp edges); and/or the like. Here, nucleic acids 427 are shown after being freed from cells 428 that carried the nucleic acids.

Nucleic acid retention is generally implemented downstream of the filters. Nucleic acid retention may be implemented by a retention matrix that binds nucleic acids 427 reversibly. Suitable retention matrices for this second function may include beads, particles, and/or membranes, among others. Exemplary retention matrices may include positively charged resins (ion exchange resins), activated silica, and/or the like. Once nucleic acids 427 are retained, additional lysing reagent or a wash solution may be moved past the retained nucleic acid 427 to wash away unretained contaminants.

Figure 20:
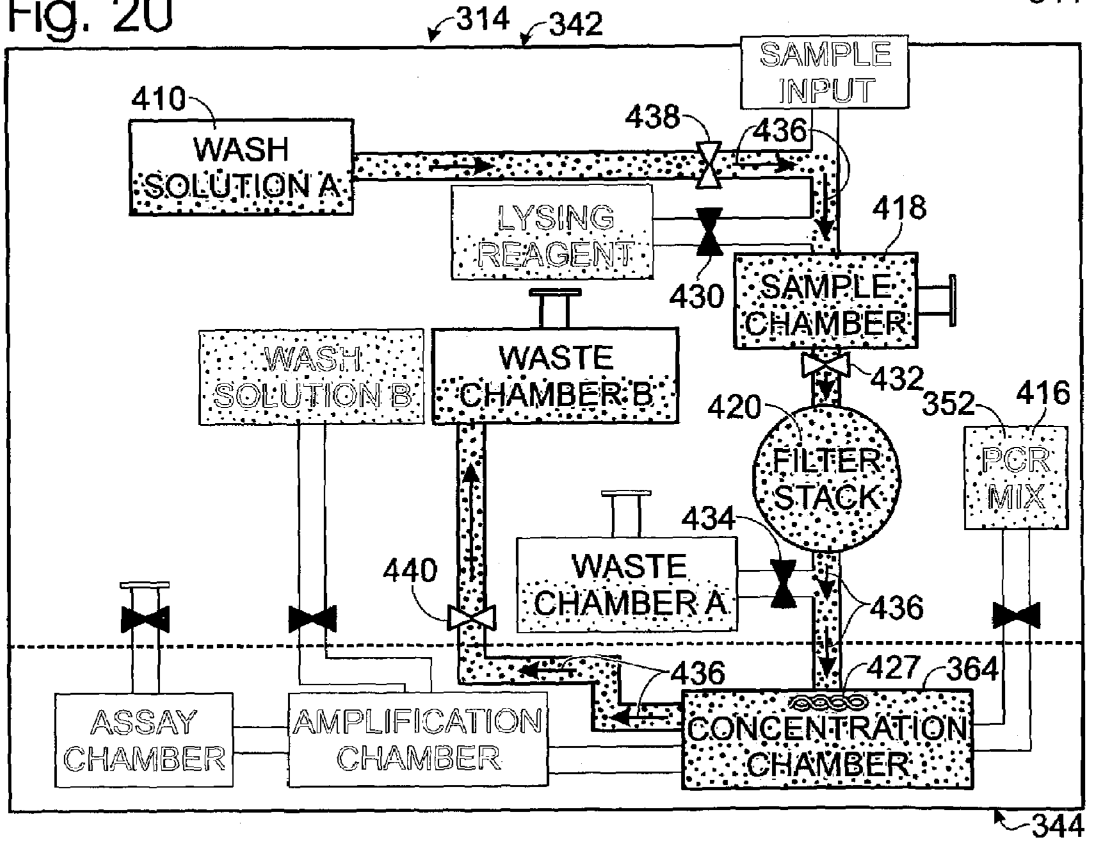
FIG. 20 is a schematic view emphasizing active regions of the cartridge of FIG. 13 during release of the nucleic acids from the filter stack and concentration of the released nucleic acids in an assay portion of the cartridge.

FIG. 20 shows active regions of fluid movement in cartridge 314 during release of nucleic acids 427 from filter stack 420 and concentration of the released nucleic acids 427 in concentration chamber 364 of assay portion 344. Fluid flows from wash solution A, shown at 410, to a distinct waste chamber, waste chamber B, along fluid path 436, through sample chamber 418 and filter stack 420. To initiate flow along path 436, valves 430 and 434 are closed, valve 432 remains open, and valves 438 and 440 are opened. Wash solution A may be configured to release nucleic acids 427 that were retained in filter stack 420 (see FIG. 19). Accordingly, wash solution A may be formulated based on the mechanism by which nucleic acids 427 are retained by the retention matrix in the filter stack. Wash solutions to release retained nucleic acid may alter the pH, ionic strength, and/or dielectric constant of the fluid, among others. Exemplary wash solutions may include a high or low pH, a high or low ionic strength, an organic solvent, and/or so on. Pre-processing may provide a first-step concentration and purification of nucleic acids from the sample.

Released nucleic acids 427 may be concentrated (and purified) further at concentration chamber 364. Concentration chamber 364 typically is formed in assay portion 344, and includes one, or typically plural electrodes. At least one of the electrodes may be electrically biased (positively) before or as the released nucleic acids enter concentration chamber 364. As a result, nucleic acids 427 that flow through concentration chamber 364 may be attracted to, and retained by, the positively biased electrode(s). Bulk fluid that carries nucleic acids 427, and additional wash solution A, may be carried on to waste chamber B. Accordingly, nucleic acids 427 may be concentrated, and may be purified further by retention in concentration chamber 364. This concentration of nucleic acids 427 may allow assay portion 344 to have fluid compartments that are very small in volume, for example, compartments, in which processing occurs, having a fluid capacity of less than about one microliter. Further aspects of electrode structure, number, disposition, and coating are described below.

Figure 21:
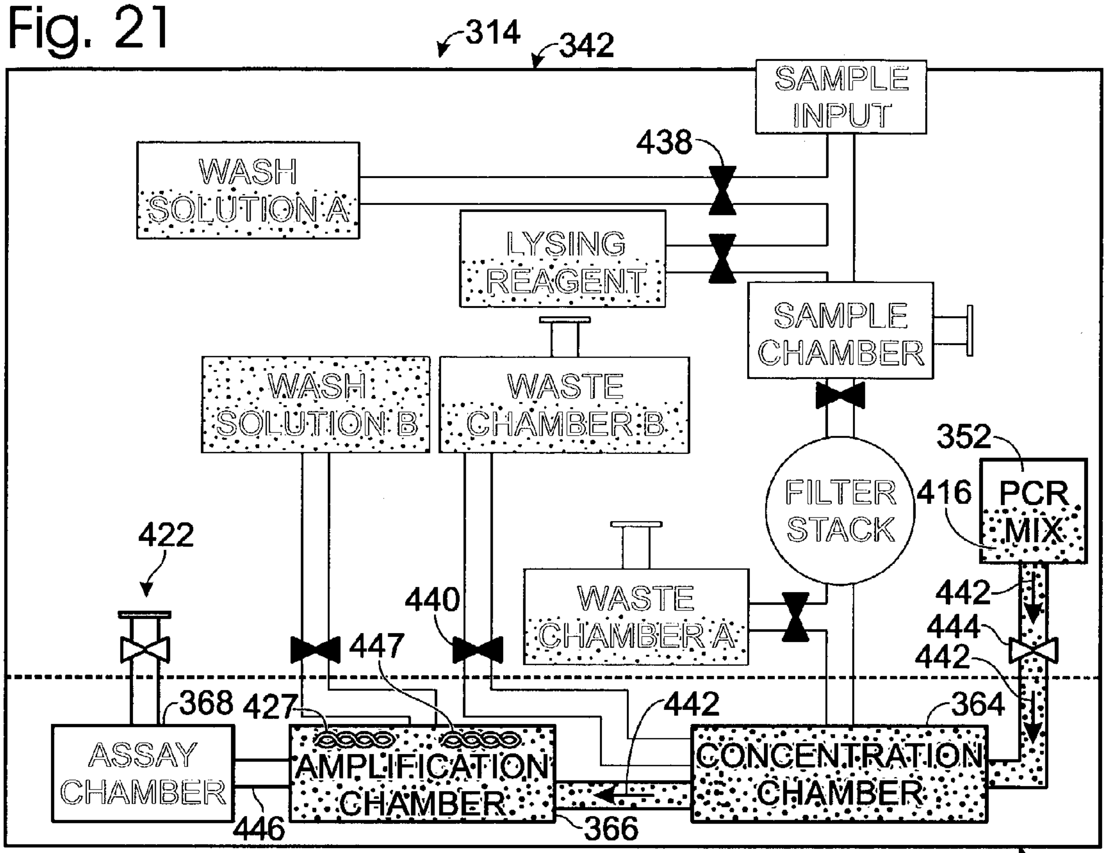
FIG. 21 is a schematic view emphasizing active regions of the cartridge of FIG. 17 during equilibration of the concentrated nucleic acids with amplification reagents and transfer to an amplification chamber on the assay portion.

FIG. 21 shows active regions of fluid movement in cartridge 314 during transfer of concentrated nucleic acids to amplification chamber 366 of assay portion 344. As shown, typically fluid flows from a chamber 352, holding PCR mix 416, to amplification chamber 366 along fluid path 442. To activate flow along path 442, valve 438 and 440 are closed, and valve 444 and vent-valve 422 are opened, as the retaining positive bias is removed from the electrode(s) in concentration chamber 364. PCR mix 416 may carry nucleic acids 427 by fluid flow. Alternatively, a positive bias may be imparted to electrodes in amplification chamber 366 (see below) to electrophoretically transfer nucleic acids 427 to amplification chamber 366, which is preloaded with PCR mix 416. In either case, flow of excess fluid out of amplification chamber 366 and into assay chamber 368 may be restricted, for example, by an electrical or optical sensor (not shown) that monitors fluid level in connecting channel 446 and signals timely closing of vent-valve 422. In some embodiments, concentration chamber 364 first may be equilibrated with PCR mix 416 prior to moving nucleic acids 427 to amplification chamber 366. For example, PCR mix 416 may be directed through an opened valve 440 to waste chamber B, before removing the retaining positive bias in concentration chamber 364 and opening vent-valve 422. Nucleic acids 427 positioned in amplification chamber 366 may be amplified, for example, by isothermal incubation or thermal cycling, to selectively increase the amount of nucleic-acid targets (or target regions) of interest 447 among nucleic acids 427, or, in some cases, may remain unamplified.

Figure 22:
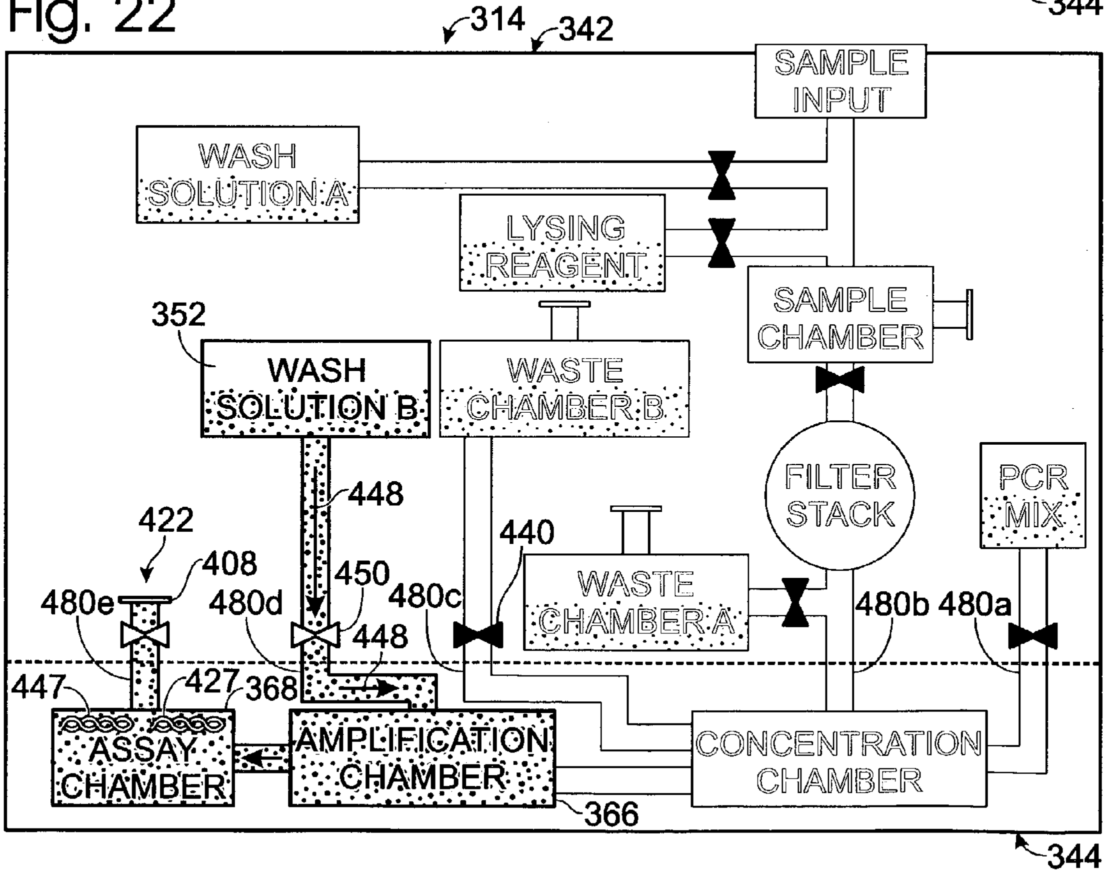
FIG. 22 is a schematic view emphasizing active regions of the cartridge of FIG. 17 during transfer of the nucleic acids, after selective amplification, to an assay chamber on the assay portion.

FIG. 22 shows active regions of fluid movement in cartridge 314 during transfer of amplified nucleic acids 447 to assay chamber 368 of assay portion 344. Fluid flows along fluid path 448 from a chamber 352 that holds wash solution B to assay chamber 368. Fluid path 448 may be activated by opening valve 450 and vent-valve 422. Overfilling assay chamber 368 may be restricted, for example, by vent 408 on vent-valve 422, or by a sensor that monitors fluid position and signals the closing of valve 450, among others. As described above, nucleic acids 427 and amplified target nucleic acids 447 may be transferred by fluid flow and/or electrophoretically using electrodes disposed in assay chamber 368 (see below). In some embodiments, amplification chamber 366 first may be equilibrated with wash solution B by closing vent-valve 422 and opening valves 440, 450, thus directing wash solution B through amplification chamber 366, concentration chamber 364, and into waste chamber B. Alternatively, or in addition, amplified nucleic acid(s) 447 may be transferred electrophoretically to an assay chamber 368 preloaded with assay solution.

Amplified target nucleic acid(s) 447 (and isolated nucleic acids 427) may be assayed in assay chamber 368. For example, assay chamber 368 may include one or more positioned receptors (a positional array) for nucleic acid identification and/or quantification, as described in Section III. Hybridization of amplified nucleic acids 447 to receptors may be assisted by electrodes positioned near to the receptors in assay chamber 368. The electrodes may be biased positively in a sequential manner to direct the amplified nucleic acids to individual members (or subgroups) of the array. After electrophoretically moving amplified target nucleic acid(s) 447 to many or all positions of the array, to allow specific binding or hybridization, unbound or unhybridized nucleic acid(s) may be removed electrophoretically and/or by fluid flow (not shown here).

Figure 23:
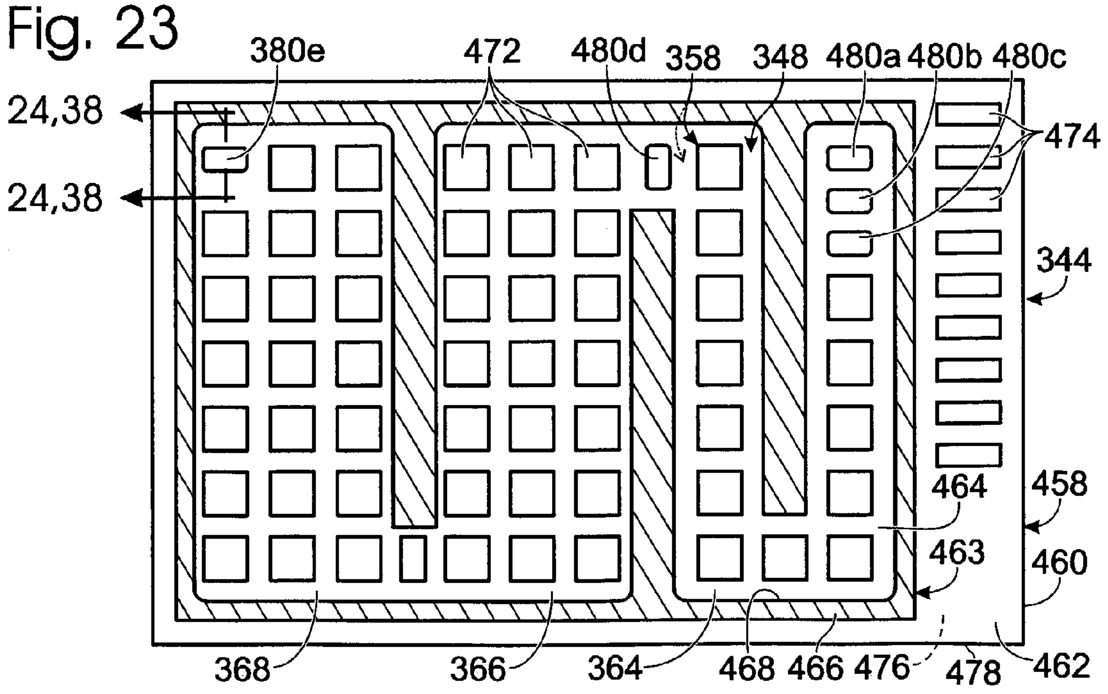
FIG. 23 is a plan view of the assay portion included in the cartridge of FIGS. 13 and 17, viewed from external the cartridge and showing selected aspects of the assay portion, in accordance with an embodiment of the invention.
Figure 24:
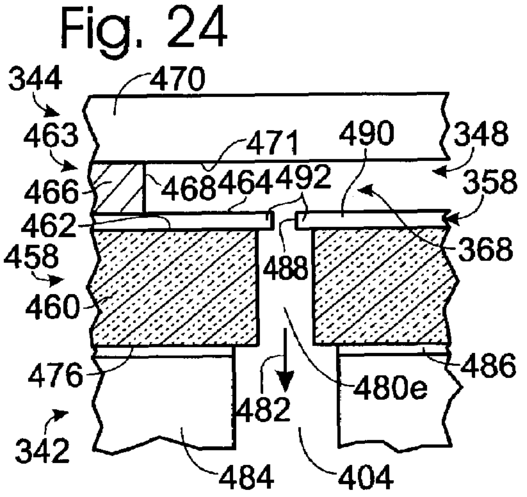
FIG. 24 is a fragmentary sectional view of the assay portion of FIG. 23, viewed generally along line 24-24 of FIG. 23, and shown attached to the fluid-handling portion of the cartridge of FIGS. 13 and 17, in accordance with an embodiment of the invention.

FIGS. 23 and 24 show selected aspects of assay portion 344, viewed in plan from external cartridge 314 and in cross-section, respectively. Assay portion 344 includes a substrate portion 458. Substrate portion 458 at least partially defines fluid compartments of the assay portion. The substrate portion may include a substrate 460. The substrate portion also may include electronic circuitry 358 and/or thin-film layers formed on the substrate and disposed near a surface 462 of the substrate. Thin-film electronic devices of the circuitry and fluid compartments of network 348 each may be disposed near a common surface of the substrate so that the electronic devices are closely apposed to, and/or in fluid contact with, regions of the fluid network. Thus, the thin-film devices may be configured to modify and/or sense a property of fluid (or sample/analyte) in fluid network 348. An exemplary material for substrate 460 is silicon, typically monocrystalline silicon. Other suitable substrate materials and properties are described below in Section III.

Fluid network 348 or a fluidically connected fluid space of one or more fluid compartments may be cooperatively defined near a surface 462 of the substrate using substrate portion 458 and a fluid barrier 463. The fluid space may determine total fluid capacity for holding fluid between the substrate portion and the fluid barrier. The term "cooperatively defined" means that the fluid space, or a fluid compartment thereof, is disposed substantially (or completely) between substrate portion 458 and fluid barrier 463. Fluid barrier 463 may be any structure that prevents substantial escape or exit of fluid out of the device, through the barrier, from fluid network 348, or a compartment thereof. Preventing substantial exit of fluid from the cartridge means that drops, droplets, or a stream of fluid does not leave the device through the fluid barrier. Accordingly, the fluid barrier may be free of openings that fluidically connect fluid network 348 to regions exterior to the device. The fluid barrier also may fluidically seal a perimeter defined at the junction between the fluid barrier and the substrate portion to prevent substantial exit of fluid from the cartridge at the junction. Typically, the fluid barrier also restricts evaporative loss from fluid network 348.

Fluid network 348 may be formed as follows. Surface 462 of substrate 460 and/or circuitry 358 may define a base wall 464 of fluid network 348. A patterned channel layer 466 may be disposed over surface 462 and base wall 464 to define side walls 468. Channel layer 466 may be formed from any suitable material, including, but not limited to, a negative or positive photoresist (such as SU-8 or PLP), a polyimide, a dry film (such as DuPont Riston), and/or a glass. Methods for patterning channel layer 466 may include photolithography, micromachining, molding, stamping, laser etching, and/or the like. A cover 470 may be disposed on channel layer 466, and spaced from base 464, to seal a top region of fluid network 348 that is spaced from electronic circuitry 358 (see FIG. 24). Cover 470 may be a component separate from channel layer 466, such as a layer that is bonded or otherwise attached to channel layer 466, or may be formed integrally with channel layer 466. In either case, fluid barrier 463 may include an opposing wall 471 that is sealed against fluid movement and escape from the cartridge. Cover 470 may be transparent, for example, glass or clear plastic, when assays are detected optically through the cover. Alternatively, cover 470 may be optically opaque, for example, when assays are detected electrically. Fluid network 348 may include spatially distinct chambers 364, 366, 368, as described above, to carry out distinct processes, and/or distinct processes may be carried out in a shared fluid compartment.

At least a thin-film portion of circuitry 358 may be formed above, and carried by, surface 462 of substrate 460. The circuitry typically includes thin-film layers that at least partially define one or more electronic circuit. The circuitry may include electrodes 472 that contact fluid in fluid network 348. Electrodes and other thin-film devices (see Section III) may be electrically coupled to electrical contact pads 474 (see FIG. 23), generally through semiconductor circuitry (including signal processing circuitry) formed on the substrate, that is, fabricated on and/or below surface 462. A given number of contact pads 474 may control a substantially greater number of electrodes and/or other thin-film devices. In preferred embodiments, contact pads 474 are electrically coupled to contacts 318, such as with a flexible circuit.

Electrodes 472 may have any suitable composition, distribution, and coating. Suitable materials for electrodes 472 are conductive materials, such as metals, metal alloys, or metal derivatives. Exemplary electrode materials include, gold, platinum, copper, aluminum, titanium, tungsten, metal silicides, and/or the like. Circuitry 358 may include electrodes at one or plural sites along base 464 of fluid network 348. For example, as shown here, electrodes may be arrayed as plural discrete units, either in single file along a channel/chamber, as in concentrator 364, and/or in a two-dimensional array, as in chambers 366, 368. Alternatively, or in addition, electrodes 472 may be elongate or have any other suitable shape or shapes. Each electrode 472 may be biased electrically on individual basis, either positively or negatively, so that nucleic acids are attracted to, or repelled from, the electrode, or the electrode may be electrically unbiased. Electrical biasing may be carried out in any suitable spatially and time-regulated manner by control apparatus 312 and/or cartridge 314, based on desired retention and/or directed movement of nucleic acids. Electrodes 472 may be coated with a permeation layer to allow access of fluid and ions to the electrode in the fluid compartment, but to exclude larger molecules (such as nucleic acids) from direct contact with the electrodes. Such direct contact may chemically damage the nucleic acids. Suitable electrode coatings may include hydrogels and/or sol-gels, among others, and may be applied by any suitable method, such as sputtering, spin-coating, etc. Exemplary materials for coatings may include polyacrylamides, agaroses, and/or synthetic polymers, among others.

Assay portion 344 is fluidically connected to fluid-handling portion 342. Any suitable interface passage (or a single passage) may be used for this connection to join fluid networks 346, 348 of the cartridge. Such fluid connection may allow fluid to be routed in relation to a fluid compartment, that is, to and/or from the fluid compartment.

Fluid networks 346, 348 may be separated spatially by substrate 460 and/or fluid barrier 463. When separated by substrate 460, interface passages may extend through substrate 460, generally between surface 462 of substrate 460 and opposing surface 476, to join the fluid networks. Interface passages may be described as feed structures to define paths for fluid movement. Alternatively, or in addition, one or more interface channels may extend around an edge 478 (FIG. 23) of substrate 460 to connect to fluid network 346 (FIGS. 17-22). For example, interface channels may extend through channel layer 466 and/or cover 470, but sealed against substantial exit of fluid from the cartridge. In alternative embodiments, fluid networks 346, 348 may be separated spatially by fluid barrier 463 rather than substrate 460, with some or all interface channels again extending through fluid barrier 463 to connect fluidly to fluid network 346.

In the depicted embodiment, interface passages, labeled 480*a* through 480*e*, extend through substrate 460 between opposing surfaces of the substrate (see FIGS. 22-24). An interface passage 480 may fluidly connect any fluid compartment of the fluid-handling portion to a fluid compartment of fluid network 348, generally by directly linking to fluid conduits or chambers of the two portions. For example, an interface passage 480 may connect a reagent reservoir 352 to a chamber (364-368) of assay portion 344, a chamber of the assay portion to a waste chamber, pre-processing chamber 420 to a chamber of the assay portion, two or more chambers of the assay portion to each other (not shown), a sample input site 350 directly to a chamber of the assay portion (also not shown), and/or a chamber of the assay portion to a valve and/or vent (such as valve-vent 422), among others. Each individual compartment of the assay portion may connect directly to any suitable number of interface passages 480. Here, concentration chamber 364 has three, 480*a*-480*c*, and amplification chamber 366 and assay chamber 368 each have one, 480*d* and 480*e*, respectively.

FIG. 24 shows how interface passage 480*e* fluidly connects assay portion 344 to fluid-handling portion 342. Interface passage 480*e* is configured to carry fluid along fluid path 482, from assay chamber 368 to valve-vent 422 (see FIG. 22). The interface passage may carry fluid to a channel (or channels) 404 of fluid-handling portion 342. Each channel 404 may be connected to an interface passage 480 through a fluid manifold 484 that directs fluid to one or plural channels 404 in fluid-handling portion 342, and to one or plural fluid compartments in assay portion 344. Accordingly, assay portion 344 may be attached fixedly to fluid manifold 484, for example, by using an adhesive 486.

An interface passage may have a diameter that varies along its length (measured generally parallel to direction of fluid flow). For example, the diameter of interface passage 480*e* may be smaller adjacent surface 462 of substrate 460, at an end region of the channel, than within an intermediate region defined by substrate 460, to form an opening 488 for routing fluid. The opening routes fluid by directing fluid to and/or from a fluid compartment. Opening 488 typically adjoins a fluid compartment. The fluid compartment is defined at least partially by the fluid barrier and may be configured so that fluid cannot exit the microfluidic device locally from the compartment, that is, directly out through the fluid barrier. The fluid compartment may be defined cooperatively between the substrate portion and the fluid barrier. The opening may include a perimeter region that forms an overhang (or shelf) 492 in which film layers 490 do not contact substrate 460. Opening 488 may have any suitable diameter, or a diameter of about 1 μm to 100 μm. The opening or hole may provide more restricted fluid flow than the substrate-defined region of the interface passage alone. Opening 488 may be defined by an opening formed in one or more film layers 490 formed on surface 462 of substrate 460. Film layers 490 typically are thin, that is, substantially thinner than the thickness of substrate 460, and may have a thickness and/or functional role as described in Section III.

FIGS. 25-31 show stepwise formation of interface passage 480*e*, opening 488, and assay chamber 368, in assay portion 344, using an exemplary method for fabrication of the assay portion. The method includes film deposition and patterning steps. Here, patterning generally refers to the process of patterned removal of a film layer after, for example, selective exposure of regions of the film layer to light.

Figure 25:
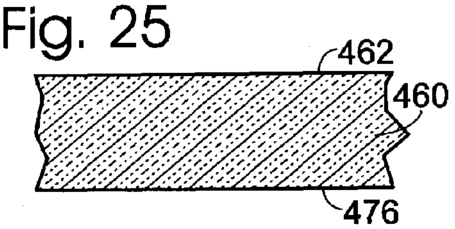
FIGS. 25-31 are fragmentary sectional views of a substrate during its modification to produce the assay portion shown in FIG. 24.

FIG. 25 shows a suitable starting material for the assay portion: a substantially planar substrate 460, with opposing surfaces 462, 476. The method described here may be carried out with a silicon substrate that is thin, for example, having a thickness of about 0.1 to 2 mm, or 0.2 to 1 mm. The substrate may be modified at surface 462, during and/or after, but typically before addition of film layers 490, to include n- and p-doped regions that form transistors, FETS, bipolar devices, and/or other semiconductor electronic devices (not shown).

Figure 26:
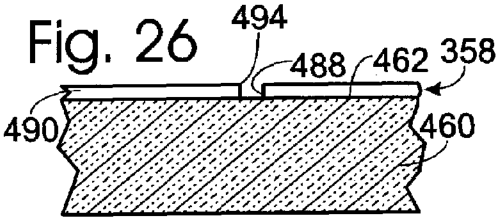

FIG. 26 shows the assay portion after application and patterning of film layers 490 on surface 462 of substrate 460. Film layers 490 may include any suitable films used to form and/or protect conductive portions of circuitry 358. Film layers may be formed of conductive material (for example, to form electrodes and conductive connections between devices), semiconductive material (for example, to form transistors using n- and p-doped material), and/or insulating material (for example, passivation layers). Film layers may be applied and patterned by conventional methods. At least one of film layers 490 may be patterned to define perimeter 494 of opening 488.

Figure 27:
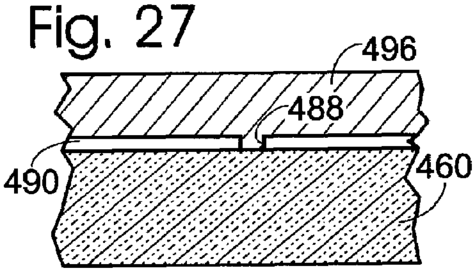

FIG. 27 shows the assay portion after unpatterned channel layer 496 has been disposed on film layers 490 and opening 488. Channel layer 496 may be applied at an appropriate thickness, typically a thickness of about 1-200 μm, more typically 2-100 μm, or even 5-50 μm. Exemplary materials for channel layer 496 (and the fluid barrier) are described above.

Figure 28:
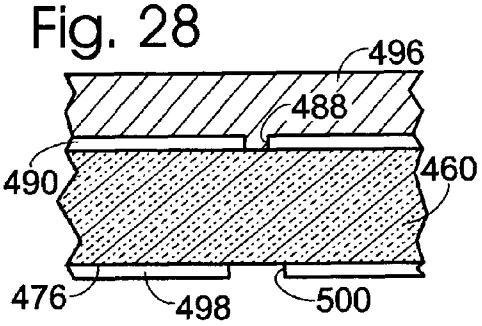

FIG. 28 shows the assay portion after an etch mask 498 has been added to opposing surface 476 of substrate 460. The etch mask may be applied as a layer of appropriate thickness, and selectively removed at a localized region (or regions) to define opening 500. Opening 500 may have any suitable diameter, but typically has a diameter greater than the diameter of opening 488. Opening 500 may be disposed opposite opening 488 so that a projection of aperture 500 onto film layers 490 forms a corresponding channel or through-hole 501 in the substrate that may encompass opening 488 circumferentially.

Figure 29:
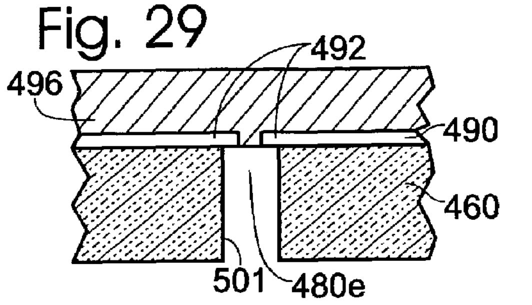

FIG. 29 shows the assay portion after formation of the substrate region of interface passage 480*e*, and after removal of etch mask 498. Substrate 460 may be etched generally orthogonally from surface 476 along a volume defined by aperture 500 (see FIG. 28) to produce channel 501. Any suitable etching procedure may be used to form the substrate portion of interface passage 480*e*. However, deep-reactive ion etching (DRIE) typically is used. One or more layers of film layers 490 may act as an etch stop, so that overhang region 492 is formed. After etching, the mask may be stripped from opposing surface 476 or left on the surface.

Figure 30:
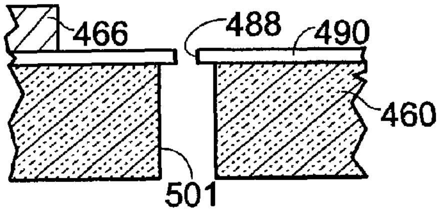

FIG. 30 shows the assay portion after regions of the unpatterned channel layer 496 have been selectively removed to form patterned channel layer 466. Selective removal may be carried out by any appropriate process, for example, photo-patterning layer 496 followed by development of the photo-patterned layer, or laser ablation.

Figure 31:
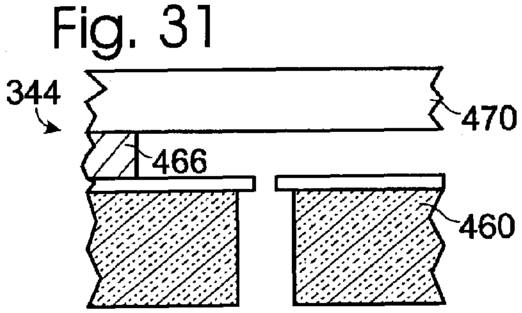

FIG. 31 shows the completed assay portion 344 after attachment of cover 470, but prior to affixing the assay portion to fluid-handling portion 342 through manifold 484. Cover 470 may be attached to fluid barrier 466 by any suitable method, such as with an adhesive, heat and pressure application, anodic bonding, sonic welding, and/or conventional methods.

Figure 32:
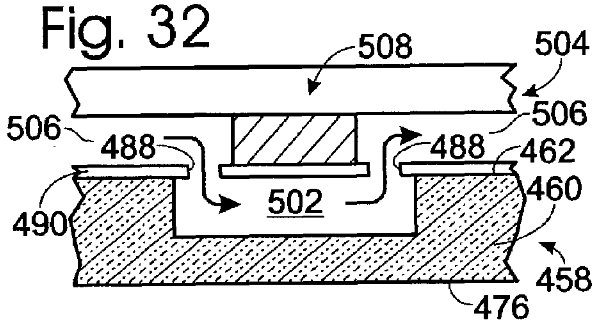
FIG. 32 is a schematic view of a channel that fluidly connects two fluid compartments formed adjacent a substrate surface, in which the channel enters and exits the substrate at the surface without communicating with the opposing surface of the substrate, in accordance with an embodiment of the invention.

FIG. 32 shows a somewhat schematic representation of an intra-chip passage 502 formed in assay portion 504. Intra-chip passage 502 may enter and exit substrate 460 from surface 462 through openings 488, without extending to opposing surface 476. Therefore, intra-chip passage 502 is distinct from interface passages 480 that extend between cartridge portions 342, 344. Intra-chip passage(s) 502 may be used to route fluid between chambers 506 defined cooperatively by substrate portion 458 and fluid barrier 508. Alternatively, or in addition, intra-chip passages may be used to mix fluid (see below), to perform a reaction or assay, and/or the like.

Figure 33:
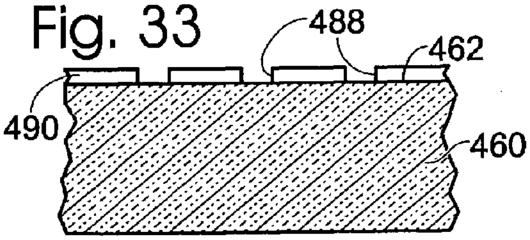
FIGS. 33-35 are fragmentary sectional views of a substrate during its modification to produce the channel of FIG. 32.
Figure 34:
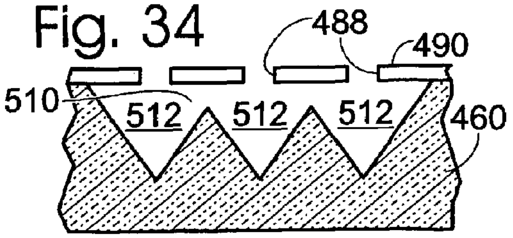
Figure 35:
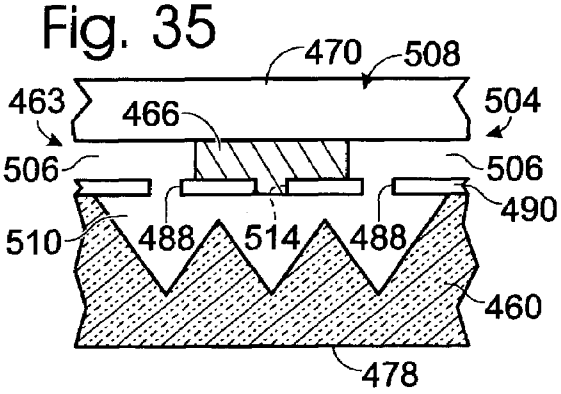

FIGS. 33-35 show stepwise formation of intra-chip passage 502 in assay portion 504 using an exemplary method. Materials and process steps are generally as described above for FIGS. 24-31. FIG. 33 shows a stage of fabrication after film layers 490 have been formed on surface 462 of substrate 460 and patterned to form plural openings 488. FIG. 34 shows the assay portion after anisotropic etching of substrate 460 under openings 488 to form a substrate recess or trough 510. Alternatively, trough 510 may be formed by isotropic etching. In either case, etchant may access substrate 460 through openings 488 to undercut film layers 490, thus joining local recesses 512, disposed under each opening 488, to form trough 510. Accordingly, openings 488 typically are spaced closely enough to allow recesses 512 to be connected fluidically during etching of substrate 460. FIG. 35 shows assay portion 504 after formation of chambers 506 using fluid barrier 508. Here, fluid barrier 508 includes channel layer 466, to define chamber side walls, and cover 470, to seal the top of chambers 506. One or more of openings 488 defined by film layers 490 and used to form trough 510 may be blocked by channel layer 466. For example, the central opening here has been sealed by channel layer 466, as shown at 514.

Figure 36:
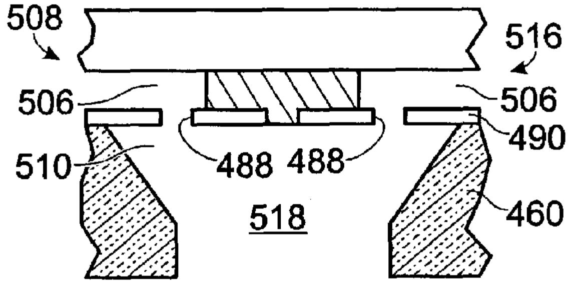
FIG. 36 is a fragmentary sectional view of a modified version of the channel of FIG. 35.

FIG. 36 shows an assay portion 516 having a manifold channel 518. Manifold channel 518 is a trans-substrate passage that connects fluidically to two or more openings 488 in thin films 490. Here, openings 488 fluidically connect manifold channel 518 to two chambers 506. However, manifold channel 518 may fluidically connect to any suitable number of compartments in the fluid network of the assay portion. Manifold channel 518 may be used to receive (or deliver) fluid from (or to) fluid-handling portion 342, for example, to deliver (or receive) fluid to (or from) one or both of chambers 506. Manifold channel 518 also may be used to direct fluid between chambers 506, as indicated in FIG. 32. An exemplary method for forming manifold channel 518 follows the procedure outlined in FIGS. 27-31, after formation of trough 510 in FIG. 34.

Figure 37:
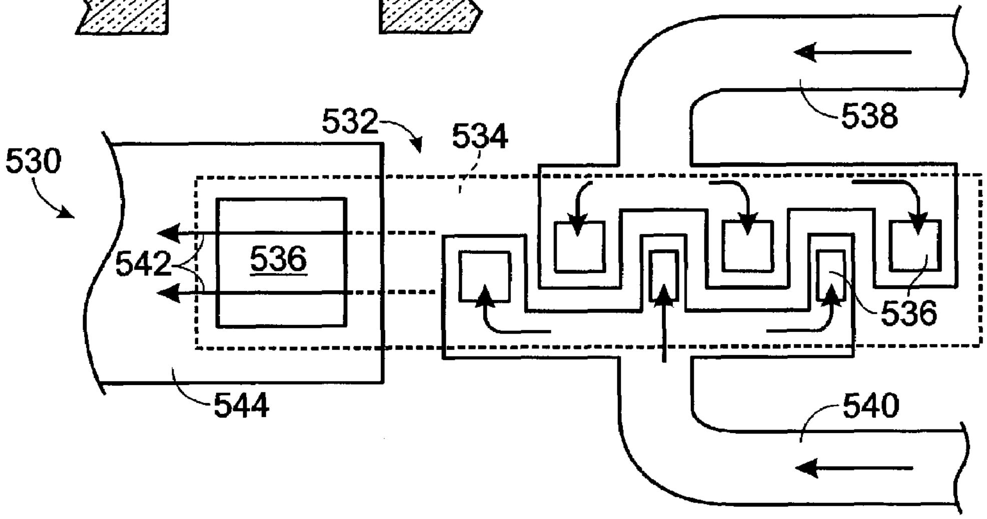
FIG. 37 is a plan view of an embodiment of a mixing chamber that may be formed in an assay portion using a variation of the substrate modification illustrated in FIGS. 33-35.

FIG. 37 shows a top plan, fragmentary view of an assay portion 530 that includes a mixing chamber 532. Mixing chamber 532 has a trough 534 similar to trough 510 of FIG. 34, formed under film layers at plural openings 536 (six inlet openings and one outlet opening are shown here). Trough 534 is fed from the fluid network of assay portion 530 by plural inlet channels 538, 540, which carry fluid into inlet openings along paths indicated by the arrows. Each channel may direct fluid, generally distinct fluids, into trough 534 using an interleaved geometry along the trough to allow mixing of the fluids from the plural channels within the trough. Mixed fluid exits trough 534, shown at 542, at an outlet opening 536 to direct fluid back into an outlet channel 544 of the fluid network of assay portion 530. In alternative embodiments, any suitable number of inlet and outlet channels may be connected to mixing chamber 532 through any suitable number of openings 536.

Figure 38:
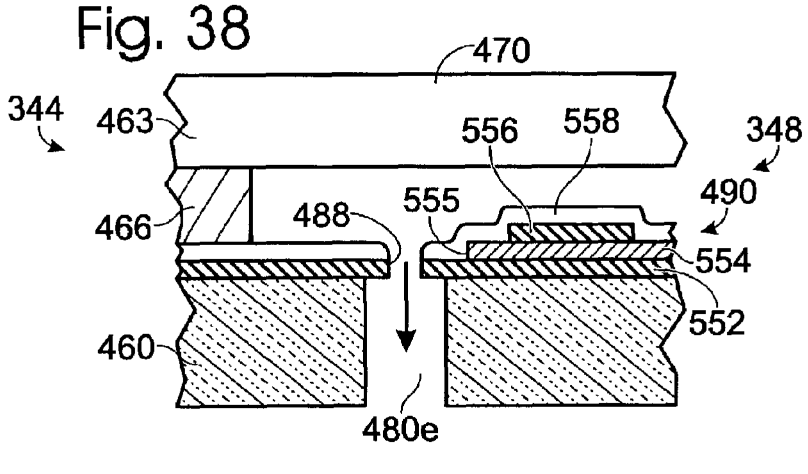
FIG. 38 is a more detailed view of selected aspects of FIG. 24, illustrating disposition of selected thin-film layers relative to an assay chamber and a substrate-defined channel, in accordance with an embodiment of the invention.

FIG. 38 shows selected portions of assay portion 344, particularly film layers 490, in more detail. Exemplary thin films may include a field oxide (FOX) layer 552, formed from substrate 460, and a phosho-silicate glass (PSG) layer 554 disposed over FOX layer 552. FOX layer 552 may provide a thermal barrier to thermally insulate heating effects. PSG layer 554 may be pulled back from opening 488, shown at 555, to avoid fluid contact with the PSG layer, which may have corrosive effects. Accordingly, PSG layer 554 defines a protected opening with a larger diameter than fluid-contacting opening 488. The thin films also may include a resistor layer 556, formed of any suitable resistive material, such as tantalum aluminum (TaAl). Current passes through the resistor layer 556 from connected conductors, formed of any appropriate conductive material, such as aluminum or an aluminum alloy (not shown). The resistor layer produces heat, which may be insulated from substrate 460 by FOX layer 552, among others. One or more passivation layers 558 may cover these thin films. Suitable materials for a passivation layer may include silicon nitride ($Si_3N_4$) or silicon carbide (SiC), among others. Additional electronic circuitry features, such as electrodes, transistors, and diodes, which may be disposed above and/or below the surface of the substrate, are not shown here.

III. Microfluidic Systems

Microfluidic systems are provided for sample manipulation and/or analysis. Microfluidic systems generally include devices and methods for receiving, manipulating, and analyzing samples in very small volumes of fluid (liquid and/or gas). The small volumes are carried by one or more fluid passages, at least one of which typically has a cross-sectional dimension or depth of between about 0.1 to 500 μm, or, more typically, less than about 100 μm or 50 μm. Microfluidic devices may have any suitable total fluid capacity. Accordingly, fluid at one or more regions within microfluidic devices may exhibit laminar flow with minimal turbulence, generally characterized by a low Reynolds number.

Fluid compartments may be fluidically connected within a microfluidic device. Fluidically connected or fluidically coupled generally means that a path exists within the device for fluid communication between the compartments. The path may be open at all times or be controlled by valves that open and close (see below).

Various fluid compartments may carry and/or hold fluid within a microfluidic device and are enclosed by the device. Compartments that carry fluid are passages. Passages may include any defined path or conduit for routing fluid movement within a microfluidic device, such as channels, processing chambers, apertures, or surfaces (for example, hydrophilic, charged, etc.), among others. Compartments that hold fluid for delivery to, or receipt from, passages are termed chambers or reservoirs. In many cases, chambers and reservoirs are also passages, allowing fluid to flow through the chambers or reservoirs. Fluid compartments within a microfluidic device that are fluidically connected form a fluid network or fluid space, which may be branched or unbranched. A microfluidic device, as described herein, may include a single fluidically connected fluid network or plural separate, unconnected fluid networks. With plural separate fluid networks, the device may be configured to receive and manipulate plural samples, at the same time and/or sequentially.

Chambers may be classified broadly as terminal and intermediate chambers. Terminal chambers generally may define as a starting point or endpoint for fluid movement within a fluid network. Such chambers may interface with the external environment, for example, receiving reagents during device manufacture or preparation, or may receive fluid only from fluid pathways within the microfluidic device. Exemplary terminal chambers may act as reservoirs that receive and/or store processed sample, reagents, and/or waste. Terminal chambers may be loaded with fluid before and/or during sample analysis. Intermediate chambers may have an intermediate position within a fluid network and thus may act as passages for processing, reaction, measurement, mixing, etc. during sample analysis.

Microfluidic devices may include one or more pumps to push and/or pull fluid or fluid components through fluid networks. Each pump may be a mechanically driven (pressure-mediated) pump or an electrokinetic pump, among others. Mechanically driven pumps may act by positive pressure to push fluid through the network. The pressure may be provided by a spring, pressurized gas (provided internally or external to the system), a motor, a syringe pump, a pneumatic pump, a peristaltic pump, and/or the like. Alternatively, or in addition, a pressure-driven pump may act by negative pressure, that is, by pulling fluid towards a region of decreased pressure. Electrokinetic or electrically driven pumps may use an electric field to promote flow of fluid and/or fluid components by electrophoresis, electroosmosis, electrocapillarity, and/or the like. In some embodiments, pumps may be micropumps fabricated by micromachining, for example, diaphragm-based pumps with piezoelectric-powered movement, among others.

Valves may be included in microfluidic devices described herein. A valve generally includes any mechanism to regulate fluid flow through a fluid network and may be a bi-directional valve, a check valve, and/or a vent, among others. For example, a valve may be used to block or permit fluid flow through a fluid passage, that is, as a binary switch, and/or to adjust the rate of fluid flow. Accordingly, operation of a valve may select a portion of a fluid network that is active, may isolate one or more portions of the fluid network, and/or may select a processing step that is implemented, among others. Therefore, valves may be positioned and operated to deliver fluid, reagents, and/or sample(s) from a fluid compartment to a desired region of a fluid network. Suitable valves may include movable diaphragms or membranes, compressible or movable passage walls, ball valves, sliding valves, flap valves, bubble valves, and/or immiscible fluids, among others. Such valves may be operated by a solenoid, a motor, pressure (see above), a heater, and/or the like.

Suitable valves may be microvalves formed on (or in) substrates along with thin-film electronic devices (see below) by conventional fabrication methods. Microvalves may be actuated by electrostatic force, piezoelectric force, and/or thermal expansion force, among others, and may have internal or external actuators. Electrostatic valves may include, for example, a polysilicon membrane or a polyimide cantilever that is operable to cover a hole formed in a substrate. Piezoelectric valves may include external (or internal) piezoelectric disks or beams that expand against a valve actuator. Thermal expansion valves may include a sealed pressure chamber bounded by a diaphragm. Heating the chamber causes the diaphragm to expand against a valve seat. Alternatively, thermal expansion valves may include a bubble valve. The bubble valve may be formed by a heater element that heats fluid to form a bubble in a passage so that the bubble blocks fluid flow through the passage. Discontinued heating collapses the bubble to allow fluid flow. Microvalves may be reversible, that is, capable of both closing and opening, or may be substantially irreversible, that is, single-use valves capable of only opening or closing. An exemplary single-use valve is a heat-sensitive obstruction in a fluid passage, for example, in a polyimide layer. Such an obstruction may be destroyed or modified upon heating to allow passage of fluid.

Vents may be used, for example, to allow release of displaced gas that results from fluid entering a fluid compartment. Suitable vents may include hydrophobic membranes that allow gas to pass but restrict passage of hydrophilic liquids. An exemplary vent is a GORETEX membrane.

A microfluidic device, as described herein, may be configured to perform or accommodate three steps: inputting, processing, and outputting. These steps are generally performed in order, for a given sample, but may be performed asynchronously when plural samples are inputted into the device.

Inputting allows a user of the microfluidic device to introduce sample(s) from the external world into the microfluidic device. Accordingly, inputting requires an interface(s) between the external world and the device. The interface thus typically acts as a port, and may be a septum, a valve, and/or the like. Alternatively, or in addition, sample(s) may be formed synthetically from reagents within the device. Reagents may be introduced by a user or during manufacture of the device. In a preferred embodiment, the reagents are introduced and sealed into the device or cartridge during manufacture.

The inputted sample(s) is then processed. Processing may include any sample manipulation or treatment that modifies a physical or chemical property of the sample, such as sample composition, concentration, and/or temperature. Processing may modify an inputted sample into a form more suited for analysis of analyte(s) in the sample, may query an aspect of the sample through reaction, may concentrate the sample, may increase signal strength, and/or may convert the sample into a detectable form. For example, processing may extract or release (for example, from cells or viruses), separate, purify, concentrate, and/or enrich (for example, by amplification) one or more analytes from an inputted sample. Alternatively, or in addition, processing may treat a sample or its analyte(s) to physically, chemically, and/or biologically modify the sample or its analyte(s). For example, processing may include chemically modifying the sample/analyte by labeling it with a dye, or by reaction with an enzyme or substrate, test reagent, or other reactive materials. Processing, also or alternatively, may include treating the sample/analyte(s) with a biological, physical, or chemical condition or agent. Exemplary conditions or agents include hormones, viruses, nucleic acids (for example, by transfection), heat, radiation, ultrasonic waves, light, voltage pulse(s), electric fields, particle irradiation, detergent, pH, and/or ionic conditions, among others. Alternatively, or in addition, processing may include analyte-selective positioning. Exemplary processing steps that selectively position analyte may include capillary electrophoresis, chromatography, adsorption to an affinity matrix, specific binding to one or more positioned receptors (such as by hybridization, receptor-ligand interaction, etc.), by sorting (for example, based on a measured signal), and/or the like.

Outputting may be performed after sample processing. A microfluidic device may be used for analytical and/or preparative purposes. Thus, the step of outputting generally includes obtaining any sample-related signal or material from the microfluidic device.

Sample-related signals may include a detectable signal that is directly and/or indirectly related to a processed sample and measured from or by the microfluidic device. Detectable signals may be analog and/or digital values, single or multiple values, time-dependent or time-independent values (e.g., steady-state or endpoint values), and/or averaged or distributed values (e.g., temporally and/or spatially), among others.

The detectable signal may be detected optically and/or electrically, among other detection methods. The detectable signal may be an optical signal(s), such as absorbance, luminescence (fluorescence, electroluminescence, bioluminescence, chemiluminescence), diffraction, reflection, scattering, circular dichroism, and/or optical rotation, among others. Suitable fluorescence methods may include fluorescence resonance energy transfer (FRET), fluorescence lifetime (FLT), fluorescence intensity (FLINT), fluorescence polarization (FP), total internal reflection fluorescence (TIRF), fluorescence correlation spectroscopy (FCS), fluorescence recovery after photobleaching (FRAP), and/or fluorescence activated cell sorting (FACS), among others. Optical signals may be measured as a nonpositional value, or set of values, and/or may have spatial information, for example, as measured using imaging methods, such as with a charge-coupled device. In some embodiments, the detectable signal may be an optoelectronic signal produced, for example, by an onboard photodiode(s). Other detectable signals may be measured by surface plasmon resonance, nuclear magnetic resonance, electron spin resonance, mass spectrometry, and/or the like. Alternatively, or in addition, the detectable signal may be an electrical signal(s), that is, a measured voltage, resistance, conductance, capacitance, power, etc. Exemplary electrical signals may be measured, for example, across a cell membrane, as a molecular binding event(s) (such as nucleic acid duplex formation, receptor-ligand interaction, etc.), and/or the like.

In some embodiments, the microfluidic device may be used for sample preparation. Sample-related material that may be outputted includes any chemical or biological compound(s), polymer(s), aggregate(s), mixture(s), assembli (es), and/or organism(s) that exits the device after processing. Such sample-related material may be a chemically modified (synthetic), biologically modified, purified, and/or sorted derivative, among others, of an inputted sample.

The microfluidic device may include distinct structural portions for fluid handling (and storage) and for conducting assays, as exemplified in Section II. These portions may be configured to carry out distinct processing and/or manipulation steps. The fluid-handling portion may be formed separately from the assay portion and may have a fluid network or fluid space that is more three-dimensional than the fluid network or fluid space of the assay portion. The fluid-handling portion may have fluid chambers with any suitable volume, including one or more chambers with a fluid capacity of tens or hundreds of microliters up to about five milliliters or more.

The fluid-handling portion may include a sample input site(s) (port) to receive sample, and plural fluid reservoirs to hold and deliver reagents and/or to receive waste. The fluid-handling portion may be dimensioned for somewhat larger volumes of fluid, in some cases, volumes of greater than one microliter or one milliliter. In addition, the fluid-handling portion may include a pre-processing site(s), formed by one or more fluid passages, to separate an analyte(s) of interest from waste material, for example, to isolate analytes (such as nucleic acids) from a sample that includes one or plural cells. The fluid-handling portion may define a generally nonplanar fluid network or fluid space. In a nonplanar or three-dimensional fluid network, one or more portions of the fluid network may be disposed greater than two millimeters from any common plane.

The assay portion may provide a site at which final sample processing occurs and/or assay signals are measured. The assay portion may be configured for manipulation and analysis of smaller sample volumes, generally having fluid chambers less than about 50 microliters, preferably less than about 10 microliters, and more preferably less than about one microliter.

The assay portion may be distinct from the fluid-handling portion, that is, formed of distinct components not shared with the fluid-handling portion. Accordingly, the assay portion may be formed separately, and then attached to the fluid-handling portion to fluidly connect fluid compartments of the portions.

The assay portion may include a substrate portion and a fluid barrier. The electronic circuitry may be disposed at least partially or at least substantially between the substrate portion and the fluid barrier. The substrate portion may cooperatively define a fluid space with the fluid barrier near a surface of the substrate portion. The electronic circuitry may include the thin-film portions or layers of an electronic circuit (or circuits), in which the thin-film layers also are disposed near the surface of the substrate. A structure that is near or proximate the surface is closer to the substrate surface than to an opposing surface of the substrate.

The electrical properties of the substrate may determine where the electronic circuitry, particularly solid-state electronic switching devices, is positioned relative to the substrate and the fluid barrier. The substrate may be a semiconductor so that some portions of the electronic circuitry are created within the substrate, for example, by n- and p-doping. Alternatively, the substrate may be an insulator. In this case, all of the electronic circuitry may be carried external to the substrate. A suitable substrate may be generally flat or planar on a pair of opposing surfaces, for example, to facilitate deposition of thin films. The substrate may be at least substantially inorganic, including as silicon, gallium arsenide, germanium, glass, ceramic, alumina, and/or the like.

Thin-film electronic circuitry includes thin films or thin-film layers. Each thin-film layer of the electronic circuitry may play a direct or auxiliary role in operation of the circuitry, that is, a conductive, insulating, resistive, capacitive, gating, and/or protective role, among others. The protective and/or insulating role may provide electrical insulation, chemical insulation to prevent fluid-mediated corrosion, and/or the like. The thin-film layers may have a thickness of less than about 100 μm, 50 μm, or 20 μm. Alternatively, or in addition, the thin-film layers may have a thickness of greater than about 10 nm, 20 nm, or 50 nm. Such thin films form electronic devices, which are described as electronic because they are controlled electronically by the electronic circuitry of the assay portion. The electronic devices are configured to modify and/or sense a property of fluid within a fluid compartment of the assay portion. Thus, the electronic devices and portions of the thin-film layers may be disposed between the substrate and the fluid network or compartment of the assay portion. Exemplary modifying devices include electrodes, heaters (for example, resistors), coolers, pumps, valves, and/or so on. Accordingly, the modified property may be analyte distribution or position within the fluid or fluid compartment, analyte mobility, analyte concentration, analyte abundance relative to related sample components, fluid flow rate, fluid isolation, or fluid/analyte temperature, among others. Alternatively, or in addition, thin-film devices may monitor or sense fluid and/or analyte conditions or positions. Exemplary sensing devices may include temperature sensors, flow-rate sensors, pH sensors, pressure sensors, fluid sensors, optical sensors, current sensors, voltage sensors, analyte sensors, and/or the like. Combining a modifying and a sensing device may allow feedback control, for example, closed loop temperature control of a fluid region within the assay portion.

Electronic circuitry included in the assay portion is flexible, in contrast to electrical circuits that respond linearly. Electronic circuits use semiconductor devices (transistors, diodes, etc.) and solid-state electronic switching so that a smaller number of input-output lines can connect electrically to a substantially greater number of electronic devices. Accordingly, the electronic circuitry may be connected to and/or may include any suitable combination of input and output lines, including power/ground lines, data input lines, fire pulse lines, data output lines, and/or clock lines, among others. Power/ground lines may provide power to modifying and sensing devices. Data input lines may provide data indicative of devices to be turned on (for example, a heater(s) or electrode(s)). Fire pulse lines may be supplied externally or internally to the chip. These lines may be configured to cause activation of a particular set of data for activating modifying and/or sensing devices. Data output lines may receive data from circuitry of the assay portion, for example, digital data from sensing devices. Based on the rate of data input and output, a single data input/output line or plural data input/output lines may be provided. With a low data rate, the single data input/output line may be sufficient, but with a higher rate, for example, to drive plural thin-film devices in parallel, one or more data input lines and a separate data input/output line may be necessary. Clock lines may provide timing of processes, such as sending and receiving data from a controller (see below).

A microfluidic device may be configured to be controlled by a control apparatus or controller. Accordingly, the microfluidic device is electrically coupled to the controller, for example, conductively, capacitively, and/or inductively. The controller may provide any of the input and/or output lines described above. In addition, the controller may provide a user interface, may store data, may provide one or more detectors, and/or may provide a mechanical interface, Exemplary functions of the controller include operating and/or providing valves, pumps, sonicators, light sources, heaters, coolers, and/or so on, in order to modify and/or sense fluid, sample, and/or analyte in the microfluidic device.

Further aspects of microfluidic devices, fluid-handling portions, assay portions, and controllers, among others, are described above in Section II.

IV. Samples

Microfluidic systems, as described herein, are configured to process samples. A sample generally includes any material of interest that is received and processed by a microfluidic system, either to analyze the material of interest (or analyte) or to modify it for preparative purposes. The sample generally has a property or properties of interest to be measured by the system or is advantageously modified by the system (for example, purified, sorted, derivatized, cultured, etc.). The sample may include any compound(s), polymer(s), aggregate(s), mixture(s), extract(s), complex (es), particle(s), virus(es), cell(s), and/or combination thereof. The analytes and/or materials of interest may form any portion of a sample, for example, being a major, minor, or trace component in the sample.

Samples, and thus analytes contained therein, may be biological. Biological samples generally include cells, viruses, cell extracts, cell-produced or -associated materials, candidate or known cell modulators, and/or man-made variants thereof. Cells may include eukaryotic and/or prokaryotic cells from any single-celled or multi-celled organism and may be of any type or set of types. Cell-produced or cell-associated materials may include nucleic acids (DNA or RNA), proteins (for example, enzymes, receptors, regulatory factors, ligands, structural proteins, etc.), hormones (for example, nuclear hormones, prostaglandins, leukotrienes, nitric oxide, cyclic nucleotides, peptide hormones, etc.), carbohydrates (such as mono-, di-, or polysaccharides, glycans, glycoproteins, etc.), ions (such as calcium, sodium, potassium, chloride, lithium, iron, etc.), and/or other metabolites or cell-imported materials, among others.

Biological samples may be clinical samples, research samples, environmental samples, forensic samples, and/or industrial samples, among others. Clinical samples may include any human or animal samples obtained for diagnostic and/or prognostic purposes. Exemplary clinical samples may include blood (serum, whole blood, or cells), lymph, urine, feces, gastric contents, bile, semen, mucus, a vaginal smear, cerebrospinal fluid, saliva, perspiration, tears, skin, hair, a tissue biopsy, a fluid aspirate, a surgical sample, a tumor, and/or the like. Research samples may include any sample related to biological and/or biomedical research, such as cultured cells or viruses (wild-type, engineered, and/or mutant, among others.), extracts thereof, partially or fully purified cellular material, material secreted from cells, material related to drug screens, etc. Environmental samples may include samples from soil, air, water, plants, and/or man-made structures, among others, being analyzed or manipulated based on a biological aspect.

Samples may be nonbiological. Nonbiological samples generally include any sample not defined as a biological sample. Nonbiological samples may be analyzed for presence/absence, level, size, and/or structure of any suitable inorganic or organic compound, polymer, and/or mixture. Suitable nonbiological samples may include environmental samples (such as samples from soil, air, water, etc.), synthetically produced materials, industrially derived products or waste materials, and/or the like.

Samples may be solid, liquid, and/or gas. The samples may be pre-processed before introduction into a microfluidic system or may be introduced directly. Pre-processing external to the system may include chemical treatment, biological treatment (culturing, hormone treatment, etc.), and/or physical treatment (for example, with heat, pressure, radiation, ultrasonic disruption, mixing with fluid, etc.). Solid samples (for example, tissue, soil, etc.) may be dissolved or dispersed in fluid before or after introduction into a microfluidic device and/or analytes of interest may be released from the solid samples into fluid within the microfluidic system. Liquid and/or gas samples may be pre-processed external to the system and/or may be introduced directly.

V. Assays

Microfluidic systems may be used to assay (analyze/test) an aspect of an inputted sample. Any suitable aspect of a biological or nonbiological sample may be analyzed by a microfluidic system. Suitable aspects may relate to a property of one or more analytes carried by the sample. Such properties may include presence/absence, level (such as level of expression of RNA or protein in cells), size, structure, activity (such as enzyme or biological activity), location within a cell, cellular phenotype, and/or the like. Structure may include primary structure (such as a nucleotide or protein sequence, polymer structure, isomer structure(s), or a chemical modification, among others), secondary or tertiary structure (such as local folding or higher order folding), and/or quaternary structure (such as intermolecular interactions). Cellular phenotypes may relate to cell state, electrical activity, cell morphology, cell movement, cell identity, reporter gene activity, and/or the like.

Microfluidic assays may measure presence/absence or level of one or more nucleic acid. Each nucleic acid analyzed may be present as a single molecule or, more typically, plural molecules. The plural molecules may be identical or substantially identical and/or may share a region, generally of twenty or more contiguous bases, that is identical. As used herein, a nucleic acid (nucleic acid species) generally includes a nucleic acid polymer or polynucleotide, formed as a chain of covalently linked monomer subunits. The monomer subunits may form polyribonucleic acids (RNA) and/or polydeoxyribonucleic acids (DNA) including any or all of the bases adenine, cytosine, guanine, uracil, thymine, hypoxanthine, xanthine, or inosine. Alternatively, or in addition, the nucleic acids may be natural or synthetic derivatives, for example, including methylated bases, peptide nucleic acids, sulfur-substituted backbones, and/or the like. Nucleic acids may be single, double, and/or triple-stranded, and may be wild-type, or recombinant, deletion, insertion, inversion, rearrangement, and/or point mutants thereof.

Nucleic acid analyses may include testing a sample to measure the presence/absence, quantity, size, primary sequence, integrity, modification, and/or strandedness of one or more nucleic acid species (DNA and/or RNA) in the sample. Such analyses may provide genotyping information and/or may measure gene expression from a particular gene(s) or genetic region(s), among others.

Genotyping information may be used for identification and/or quantitation of microorganisms, such as pathogenic species, in a sample. Exemplary pathogenic organisms may include, but are not limited to, viruses, such as HIV, hepatitis virus, rabies, influenza, CMV, herpesvirus, papilloma viruses, rhinoviruses; bacteria, such as *S. aureus, C. perfringens, V. parahaemolyticus, S. typhimurium, B. anthracis, C. botulinum, E. coli*, and so on; fungi, such as those included in the genuses *Candida, Coccidioides, Blastomyces, Histoplasma, Aspergillus, Zygomycetes, Fusarium* and *Trichosporon*, among others; and *protozoans*, such as *Plasmodia* (for example, *P. vivax, P. falciparum*, and *P. malariae*, etc.), *G. lamblia, E. histolitica, Cryptosporidium*, and *N. fowleri*, among others. The analysis may determine, for example, if a person, animal, plant, food, soil, or water is infected with or carries a particular microorganism(s). In some cases, the analysis may also provide specific information about the particular strain(s) present.

Genotyping analysis may include genetic screening for clinical or forensic analysis, for example, to determine the presence/absence, copy number, and/or sequence of a particular genetic region. Genetic screening may be suitable for prenatal or postnatal diagnosis, for example, to screen for birth defects, identify genetic diseases and/or single-nucleotide polymorphisms, or to characterize tumors. Genetic screening also may be used to assist doctors in patient care, for example, to guide drug selection, patient counseling, etc. Forensic analyses may use genotyping analysis, for example, to identify a person, to determine the presence of a person at a crime scene, or to determine parentage, among others. In some embodiments, nucleic acids may carry and/or may be analyzed for single nucleic polymorphisms.

Microfluidic systems may be used for gene expression analysis, either quantitatively (amount of expression) or qualitatively (expression present or absent). Gene expression analysis may be conducted directly on RNA, or on complementary DNA synthesized using sample RNA as a template, for example, using a reverse transcriptase enzyme. The complementary DNA may be synthesized within a microfluidic device, such as the embodiment described in Section II, for example, in the assay portion, or external to the device, that is, prior to sample input.

Expression analysis may be beneficial for medical purposes or research purposes, among others. For example, expression analysis of individual genes or sets of genes (profiling) may be used to determine or predict a person's health, guide selection of a drug(s) or other treatment, etc. Alternatively, or in addition, expression may be useful in research applications, such as reporter gene analysis, screening libraries (for example, libraries of chemical compounds, peptides, antibodies, phage, bacteria, etc.), and/or the like.

Assays may involve processing steps that allow a property of an analyte to be measured. Such processing steps may include labeling, amplification, binding to a receptor(s), and/or so on.

Labeling may be carried out to enhance detectability of the analyte. Suitable labels may be covalently or noncovalently coupled to the analyte and may include optically detectable dyes (fluorophores, chromophores, energy transfer groups, etc.), members of specific binding pairs (SBPs, such as biotin, digoxigenin, epitope tags, etc.; see Table 1), and/or the like. Coupling of labels may be conducted by an enzymatic reaction, for example, nucleic acid-templated replication (or ligation), protein phosphorylation, and/or methylation, among others, or may be conducted chemically, biologically, or physically (for example, light- or heat-catalyzed, among others).

For nucleic acid analyses, amplification may be performed to enhance sensitivity of nucleic acid detection. Amplification is any process that selectively increases the abundance (number of molecules) of a target nucleic acid species, or a region within the target species. Amplification may include thermal cycling (for example, polymerase chain reaction, ligase chain reaction, and/or the like) or may be isothermal (for example, strand displacement amplification). Further aspects of amplification are described above in Section II.

Receptor binding may include contacting an analyte (or a reaction product templated by, or resulting from, the presence of the analyte) with a receptor that specifically binds the analyte. The receptor(s) may be attached to, or have a fixed position within, a microfluidic compartment, for example, in an array, or may be distributed throughout the compartment. Specific binding means binding that is highly selective for the intended partner in a mixture, generally to the exclusion of binding to other moieties in the mixture. Specific binding may be characterized by a binding coefficient of less than about $10^{-4}$ M, and preferred specific binding coefficients are less than about $10^{-5}$ M, $10^{-7}$ M, or $10^{-9}$ M. Exemplary specific binding pairs that may be suitable for receptor-analyte interaction are listed below in Table 1.

TABLE 1

Representative Specific Binding Pairs

| First SBP Member | Second SBP Member |
|---|---|
| biotin | avidin or streptavidin |
| antigen | antibody |
| carbohydrate | lectin or carbohydrate receptor |
| DNA | antisense DNA; protein |
| enzyme substrate | enzyme; protein |
| histidine | NTA (nitrilotriacetic acid) |
| IgG | protein A or protein G |
| RNA | antisense or other RNA; protein |

Further aspects of sample assays, particularly assay of nucleic-acid analytes in samples, are described above in Section II.

It is believed that the disclosure set forth above encompasses multiple distinct embodiments of the invention. While each of these embodiments has been disclosed in specific form, the specific embodiments thereof as disclosed and illustrated herein are not to be considered in a limiting sense as numerous variations are possible. The subject matter of this disclosure thus includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A microfluidic device for analysis of a sample, comprising:

a substrate portion partially defining a chamber for receiving the sample, the substrate portion including a substrate having opposing surfaces, and a plurality of thin-film layers formed on the substrate above and adjacent the same opposing surface, the thin-film layers forming a plurality of electronic devices, each of at least two of the electronic devices being formed by a different subset of the plurality of thin-film layers, the at least two electronic devices including 1) a temperature control device for controlling the temperature of fluid in the chamber, and 2) an other electronic device configured to sense or modify a property of fluid in the chamber; and a fluid barrier connected to the substrate portion to form a wall that seals the chamber against local exit of fluid out of the microfluidic device from the chamber through the wall.

2. The device of claim 1, wherein the other electronic device is selected from the group consisting of an electrode, a sensor, a transducer, an optical-based device, an acoustic-based device, an electric field-based device, and a magnetic field-based device.

3. The device of claim 1, wherein the other electronic device Includes a plurality of electronic devices, each device of such plurality being configured to modify or sense a property of fluid in a region of the chamber, the temperature control device being configured to control the temperature of fluid in the region.

4. The device of claim 1, wherein the temperature control device includes plural electronic devices disposed to independently control the temperature of different regions of the chamber.

5. The device of claim 1, wherein the temperature control device includes a thin-film resistor heater and a temperature sensor.

6. The device of claim 5, wherein the thin-film resistor heater and the temperature sensor are different devices.

7. A microfluidic device for analysis of a sample, comprising:

a substrate portion partially defining a compartment for holding fluid, the substrate portion including a substrate having opposing surfaces and defining a line that is generally normal to the opposing surfaces, and a plurality of thin-film electronic devices formed on the substrate above and adjacent the same opposing surface, each of the electronic devices being configured to sense or modify a property of fluid in the compartment, at least two of the electronic devices being intersected by the line; and a fluid barrier connected to the substrate portion to form a wall that seals the compartment against local exit of fluid out of the microfluidic device from the compartment through the wall.

8. The device of claim 7, at least one of the at least two electronic devices being an electrode.

9. The device of claim 7, at least one of the at least two electronic devices being a thin-film resistor heater.

10. The device of claim 7, at least one of the at least two electronic devices being a temperature sensor.

11. The device of claim 10, the temperature sensor including a thermocouple.

12. The device of claim 7, the at least two electronic devices including a distinct heater and temperature sensor.

13. The device of claim 7, the thin-film electronic devices being formed by a plurality of thin-film layers, at least one of the thin-film layers being included in more than one of the at least two electronic devices.

14. The device of claim 13, the at least one thin-film layer forming a heater and a portion of a temperature sensor of the at least two electronic devices.

15. The device of claim 7, the substrate being a semiconductor.

16. The device of claim 7, the property being selected from the group consisting of temperature, flow rate, presence/absence, electric field strength or polarity, distribution of sample in the fluid, amount of sample in the fluid, and mobility of sample in the fluid.

17. A microfluidic device for analysis of a sample, comprising:

a substrate portion partially defining a compartment for holding fluid, the substrate portion including a substrate having opposing surfaces and defining a line extending generally normal to the opposing surfaces, and a plurality of thin-film layers formed on the substrate above and adjacent the same opposing surface and defining a pair of electronic devices using a different subset of the plurality of thin-film layers for each device of the pair, each electronic device being operable to sense or modify a property of the sample in the compartment, wherein the line intersects the pair of electronic devices; and a fluid barrier connected to the substrate portion to form a wall that seals the compartment against local exit of fluid out of the microfluidic device from the compartment through the wall.

18. The device of claim 17, the electronic devices being selected from an electrode, a sensor, a transducer, an optical-based device, an acoustic-based device, an electric field-based device, and a magnetic field-based device.

19. The device of claim 17, the property being selected from the group consisting of temperature, an optical characteristic, an electrical characteristic, a magnetic characteristic, velocity, amount, concentration, distribution, and mobility.

20. A microfluidic device for analyzing a sample, comprising:

means for introducing the sample to a compartment partially defined by a substrate portion and sealed by a fluid barrier connected to the substrate portion to form a wall that seals the compartment against local exit of fluid out of the microfluidic device from the compartment through the wall; and means for interacting with the sample in the compartment, such interacting means including at least two electronic devices provided by a plurality of thin-film layers formed on a substrate of the substrate portion, the substrate having opposing surfaces, the thin-film layers being formed above and adjacent the same opposing surface, each of the at least two electronic devices being provided by a different subset of the plurality of thin-film layers.

21. The device of claim 20, wherein the means for introducing includes means for moving fluid mechanically.

22. The device of claim 20, wherein the means for interacting at least senses or modifies a property of the sample.

23. The device of claim 22, the property being selected from the group consisting of temperature, an optical characteristic, an electrical characteristic, a magnetic characteristic, velocity, amount, concentration, distribution, and mobility.

24. The device of claim 20, wherein the same opposing surface defines a line that extends generally normal to the same opposing surface, and wherein the line intersects the at least two electronic devices.

25. A microfluidic device for analysis of a sample, comprising:

a substrate portion partially defining a chamber having a plurality of regions for processing the sample, the substrate portion including a substrate having a pair of opposing surfaces, and a plurality of thin-film layers formed on the substrate above and adjacent the same one of the pair of opposing surfaces, the thin-film layers providing a plurality of temperature control devices for controlling the temperature of fluid in the chamber, the control devices including at least one temperature sensor and at least one heater adjacent each region of the chamber, each temperature control device being configured to be independently regulated to provide a different thermal zone for each region of the chamber.

26. The device of claim 25, each temperature control device being included in a closed loop, the closed loop including control electronics configured to receive a temperature set point and a power device configured to energize the temperature control device under control of the control electronics.

27. The device of claim 25, the substrate portion including a thermal insulation layer formed from the substrate, the thickness of the thermal insulation layer for at least two of the thermal zones being different.

28. The device of claim 27, the substrate being at least substantially formed of silicon, the thermal insulation layer including a field oxide formed from the silicon.

29. The device of claim 25, the chamber being a plurality of chambers that are fluidically connected, at least two of the thermal zones being included in distinct chambers of the plurality.

* * * * *

UNITED STATES PATENT AND TRADEMARK OFFICE

CERTIFICATE OF CORRECTION

PATENT NO. : 7,338,637 B2

APPLICATION NO. : 10/355397

DATED : March 4, 2008

INVENTOR(S) : Grant Pease et al.

It is certified that error appears in the above-identified patent and that said Letters Patent is hereby corrected as shown below:

In column 35, line 59, in Claim 3, delete "Includes" and insert -- includes --, therefor.

Signed and Sealed this

Nineteenth Day of August, 2008

JON W. DUDAS

*Director of the United States Patent and Trademark Office*